United States Patent [19]
Joh

[11] 4,082,670
[45] Apr. 4, 1978

[54] HOLLOW FIBER PERMEABILITY APPARATUS

[76] Inventor: Yasushi Joh, c/o Nippon Zeon Co., Ltd. 2-6-1 Marunouchi, Chiyoda-ku, Tokyo, Japan

[21] Appl. No.: 653,351

[22] Filed: Jan. 29, 1976

[30] Foreign Application Priority Data

| Feb. 1, 1975 | Japan | 50-13563 |
| Feb. 15, 1975 | Japan | 50-19355 |
| Mar. 10, 1975 | Japan | 50-28845 |
| Jun. 20, 1975 | Japan | 50-76355 |
| Oct. 29, 1975 | Japan | 50-130201 |

[51] Int. Cl.² ............................................. B01D 31/00
[52] U.S. Cl. ............................. 210/195 R; 210/321 B; 210/456
[58] Field of Search ................. 210/22, 23 H, 23 F, 210/456, 321 R, 321 A, 321 B, 195 R; 55/16, 158; 23/258.5 M

[56] References Cited

U.S. PATENT DOCUMENTS

| 3,622,004 | 11/1971 | Meyer | 210/456 X |
| 3,669,878 | 6/1972 | Marantz et al. | 210/22 |
| 3,697,418 | 10/1972 | Johnson | 210/22 |
| 3,722,691 | 3/1973 | Francois | 210/456 X |
| 3,728,256 | 4/1973 | Cooper | 210/456 X |

Primary Examiner—Frank A. Spear, Jr.
Attorney, Agent, or Firm—McDougall, Hersh & Scott

[57] ABSTRACT

A hollow-fiber permeability apparatus comprises a housing having a permeating region, a bundle of permeable-wall hollow fibres in the permeating region, an inlet tube for supplying a first fluid into the spaces between the fibres, an outlet tube for withdrawing the first fluid, a portion of the housing being of enlarged cross-section relative to said bundle to define a space between the bundle and a wall of the housing into which at least part of the first fluid can pass, and means for passing a second fluid through the fibres such that materials selectively permeate through the walls of the fibres.

33 Claims, 70 Drawing Figures

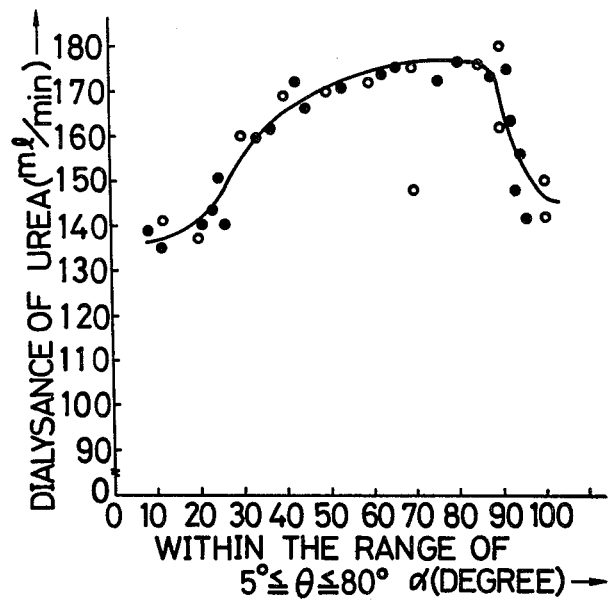
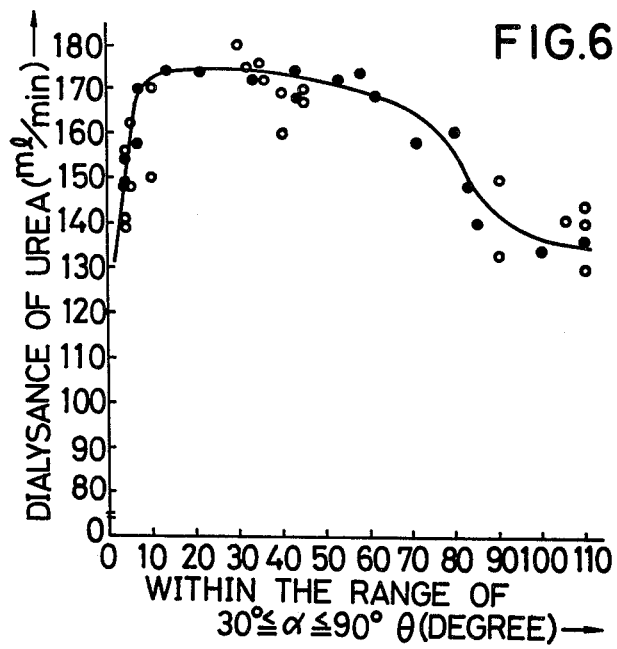

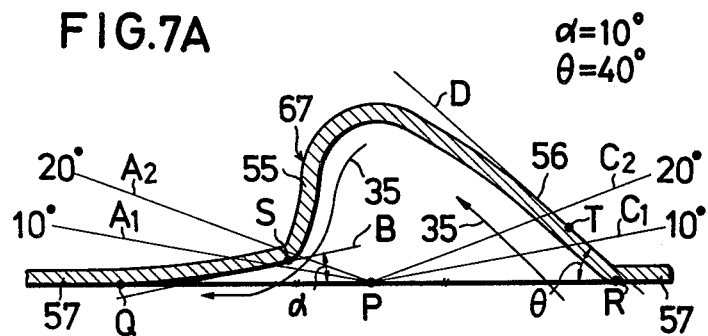
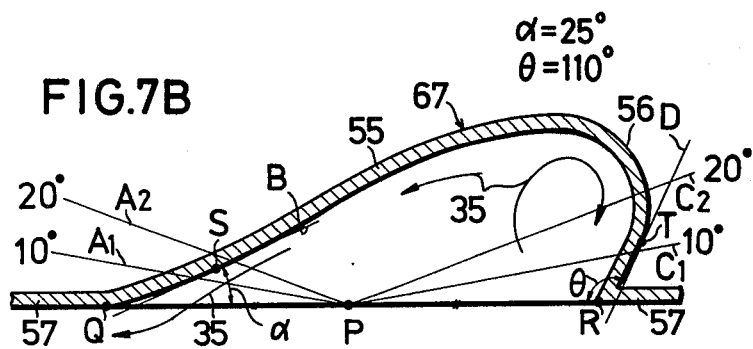
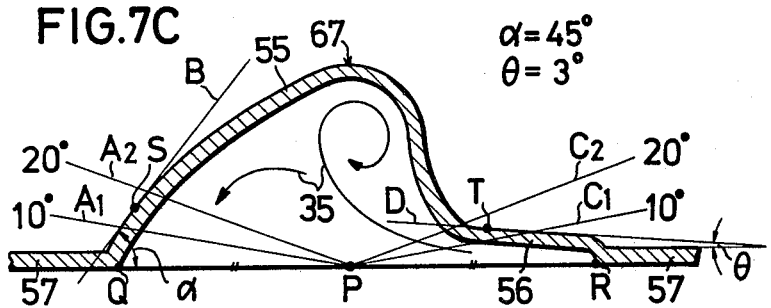

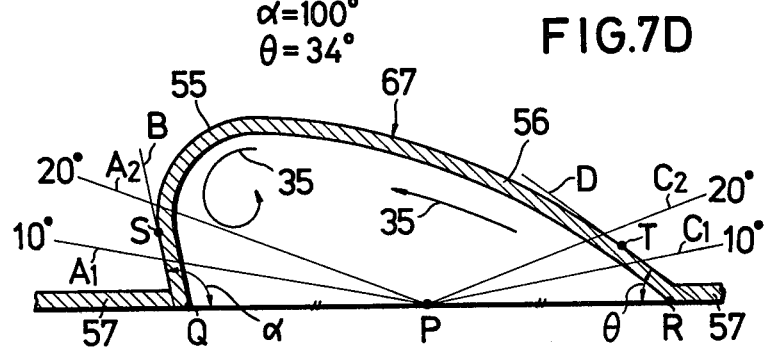
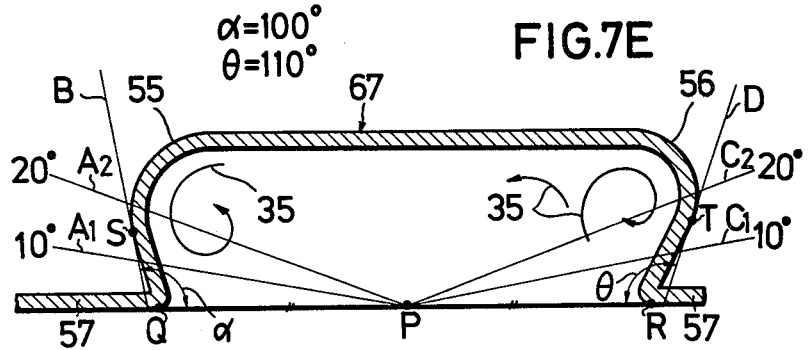
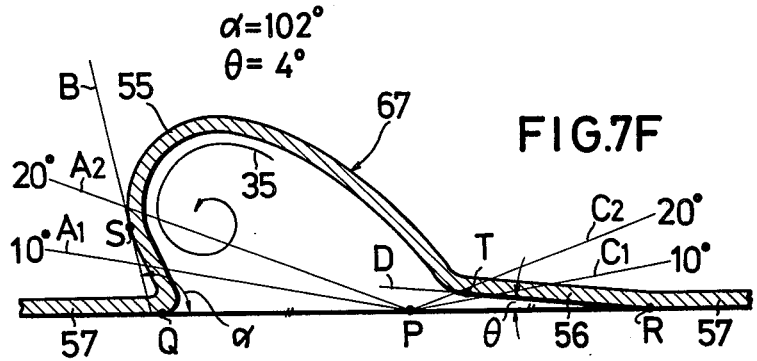

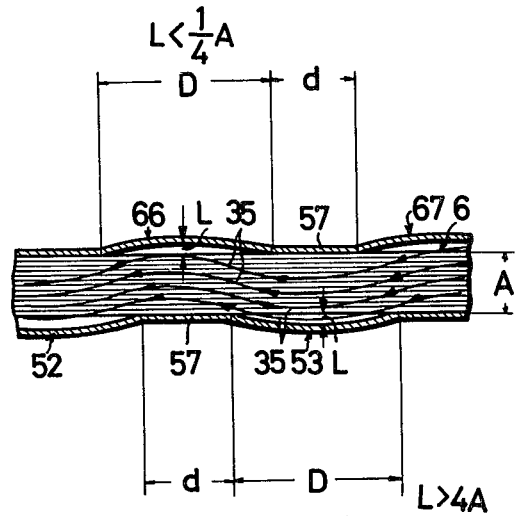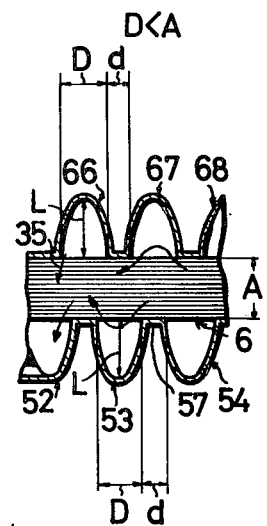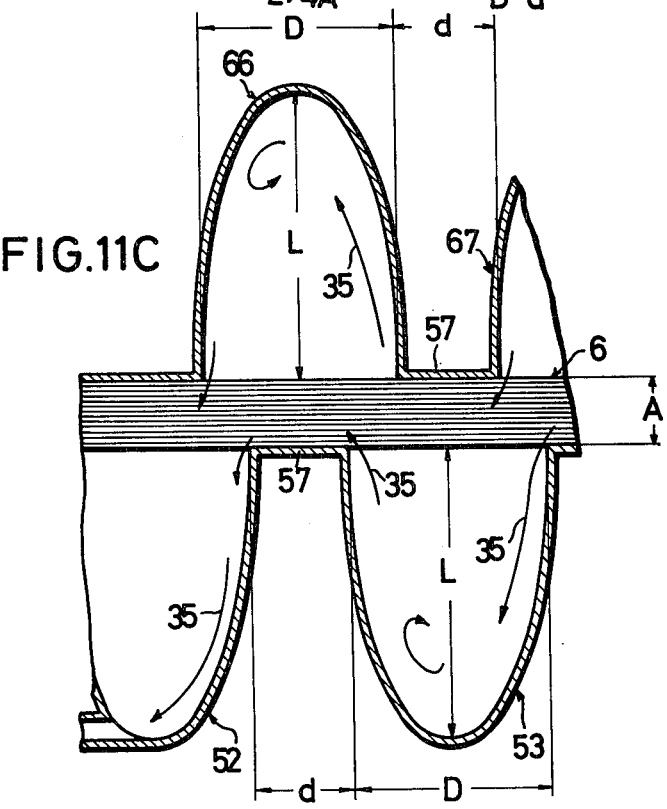

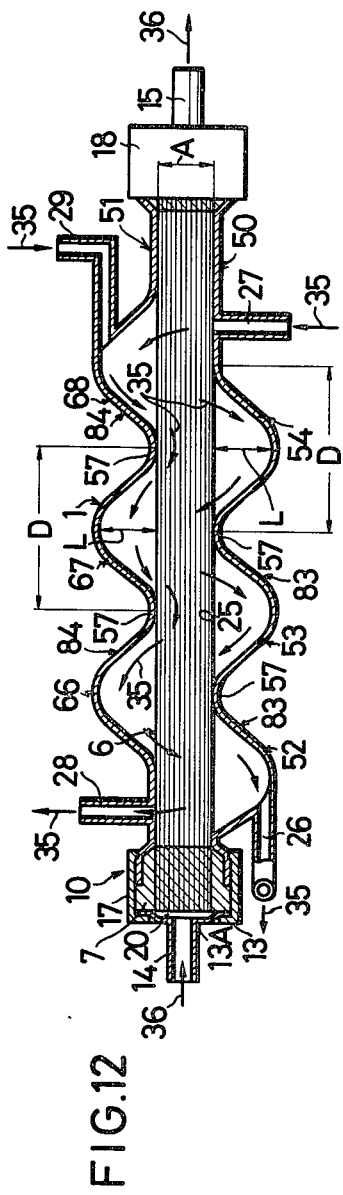
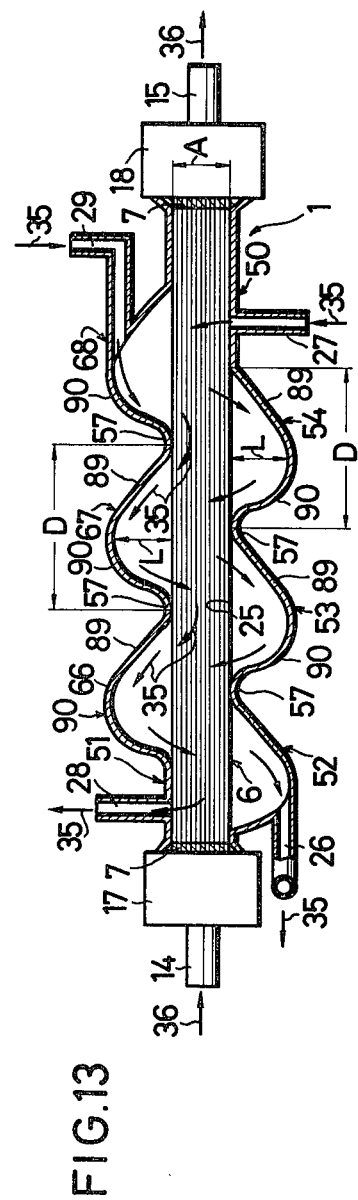
FIG.12
FIG.13

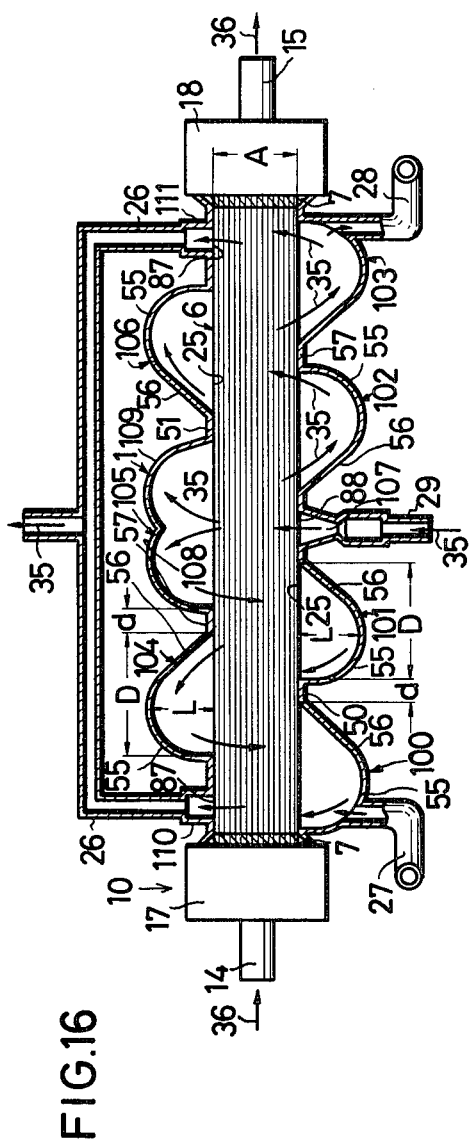
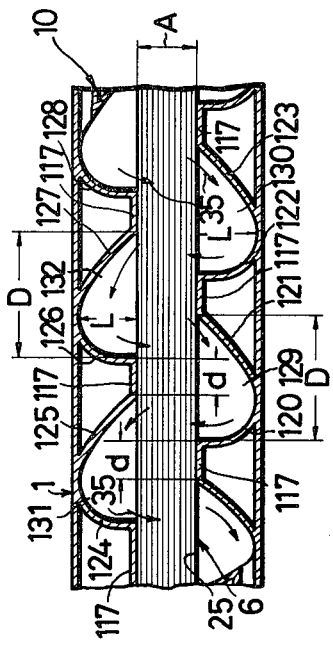
FIG.16
FIG.17

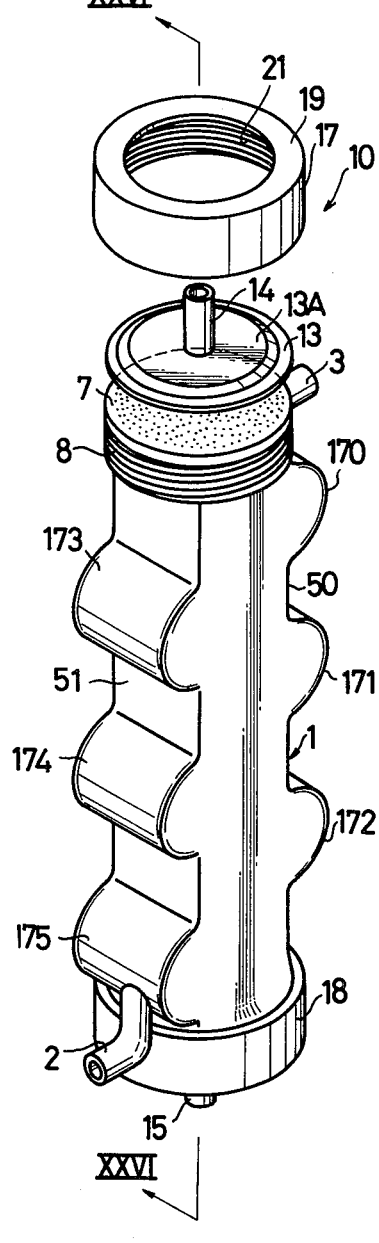
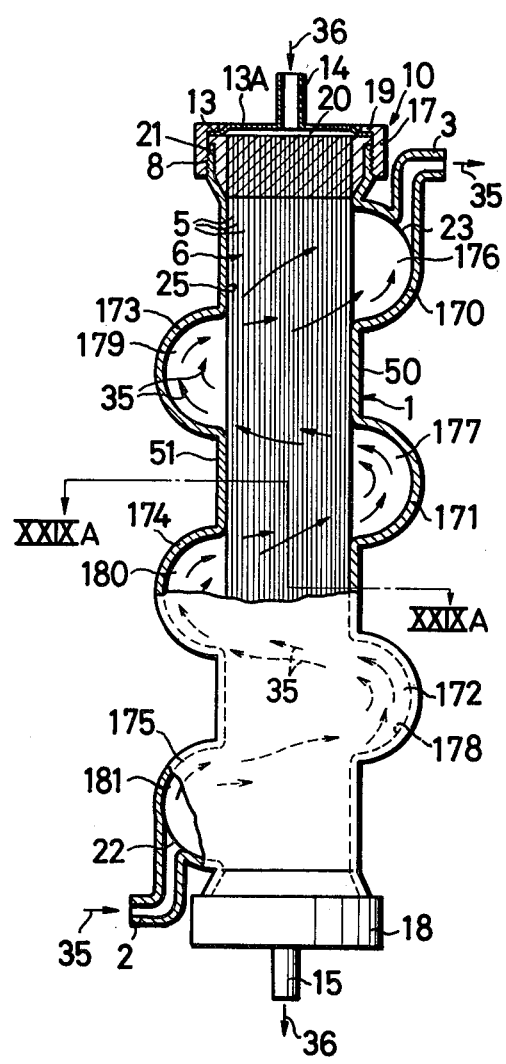

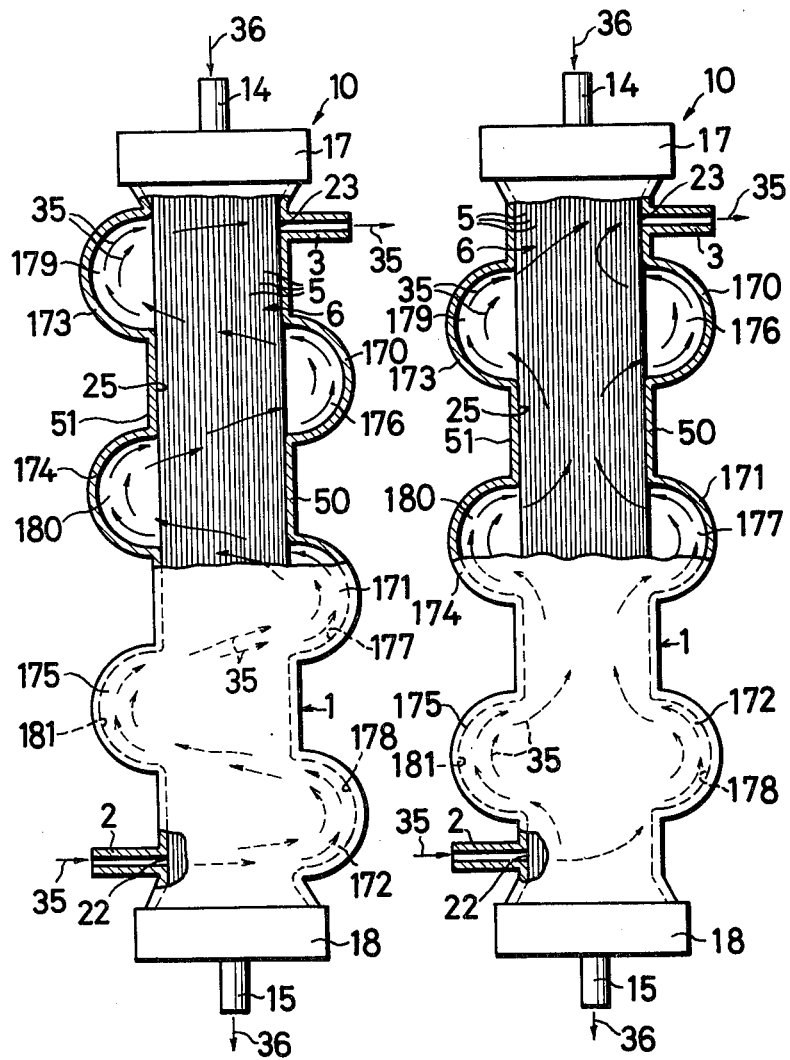

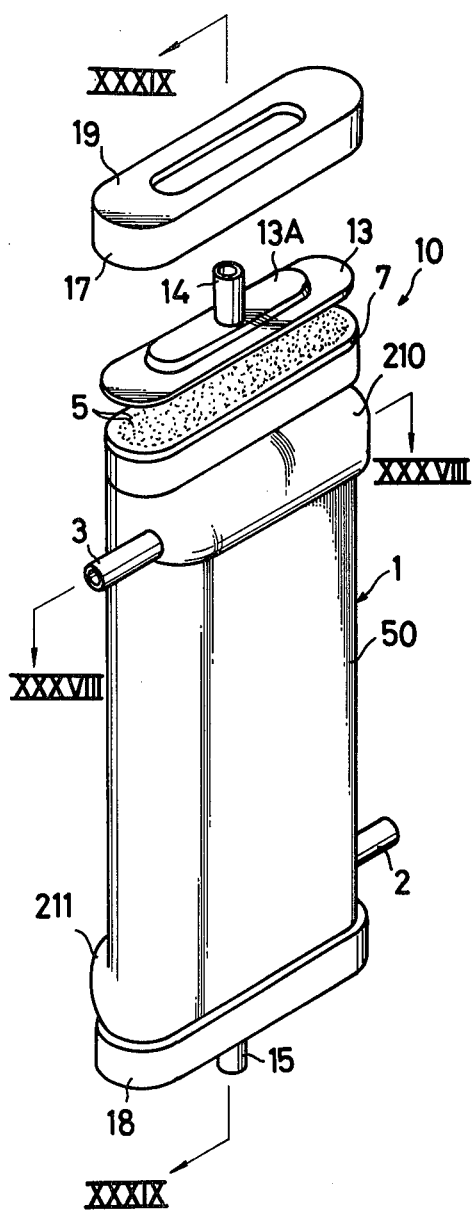

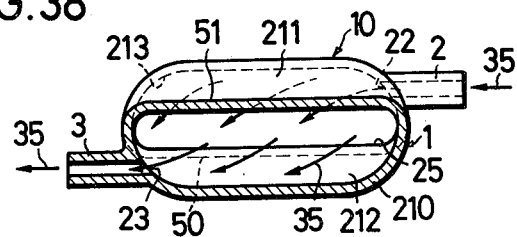
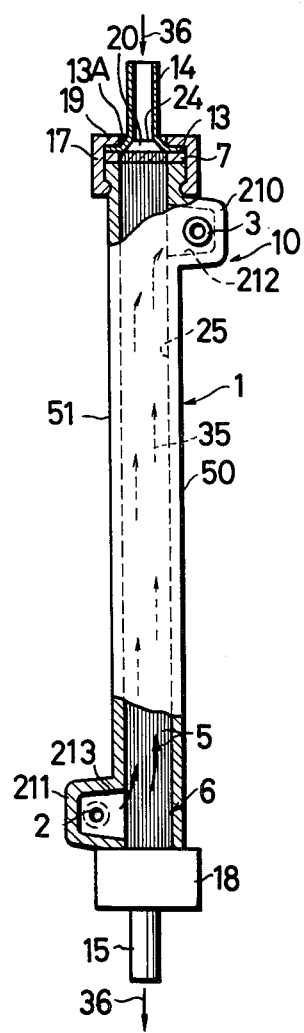
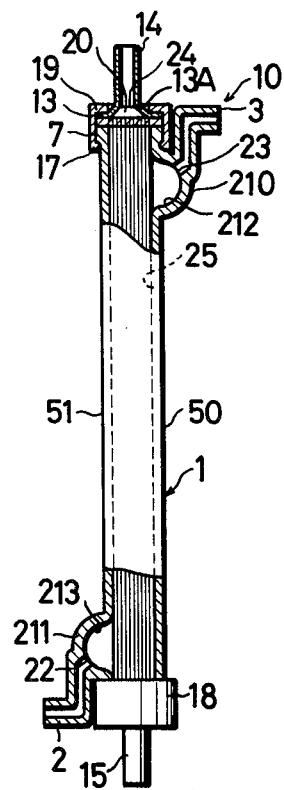

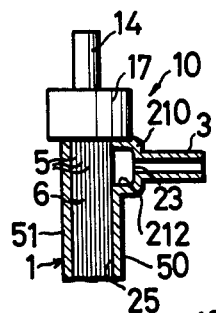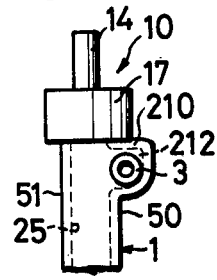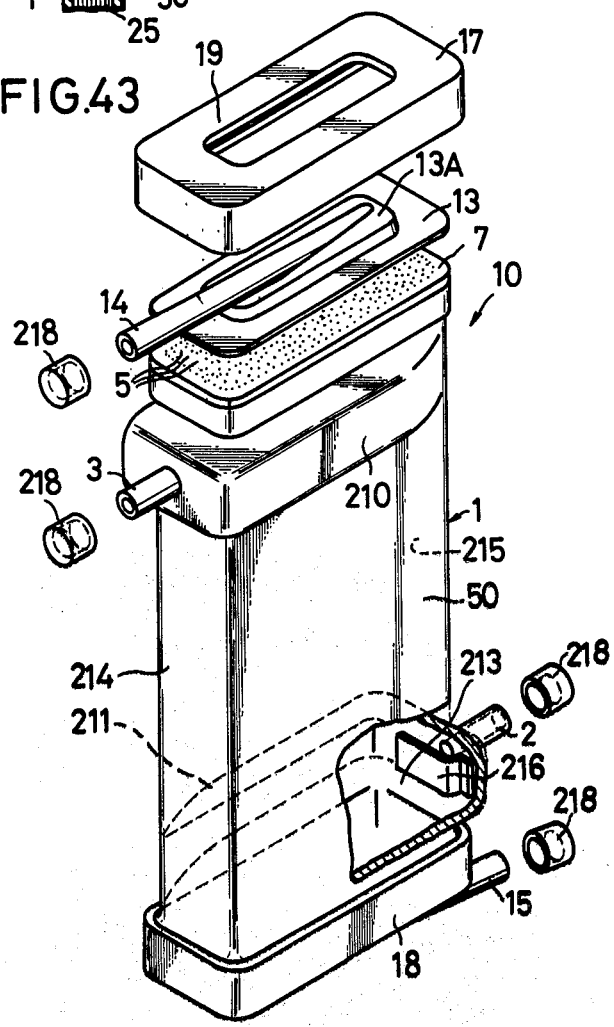

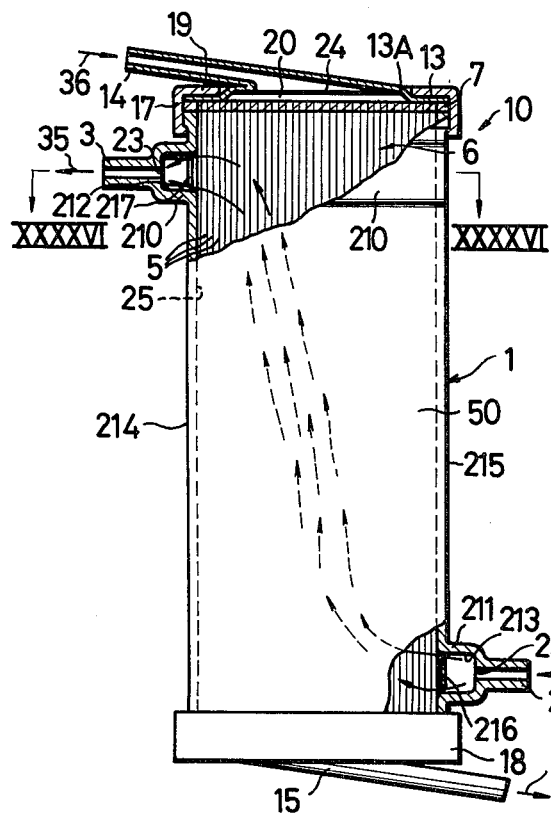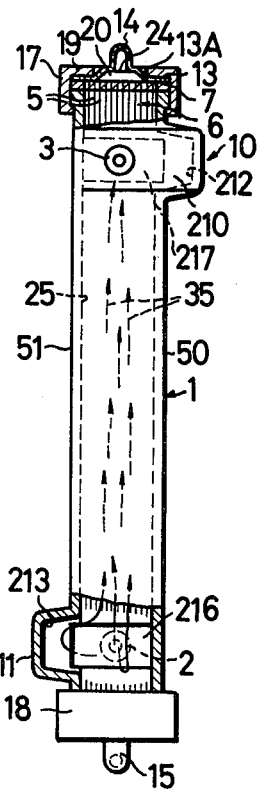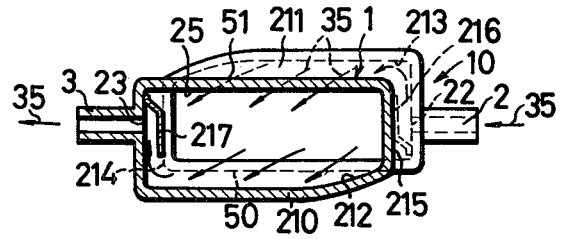

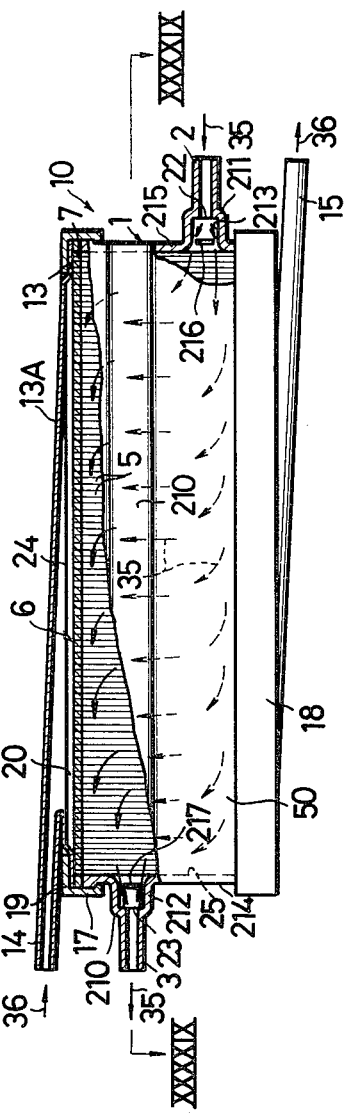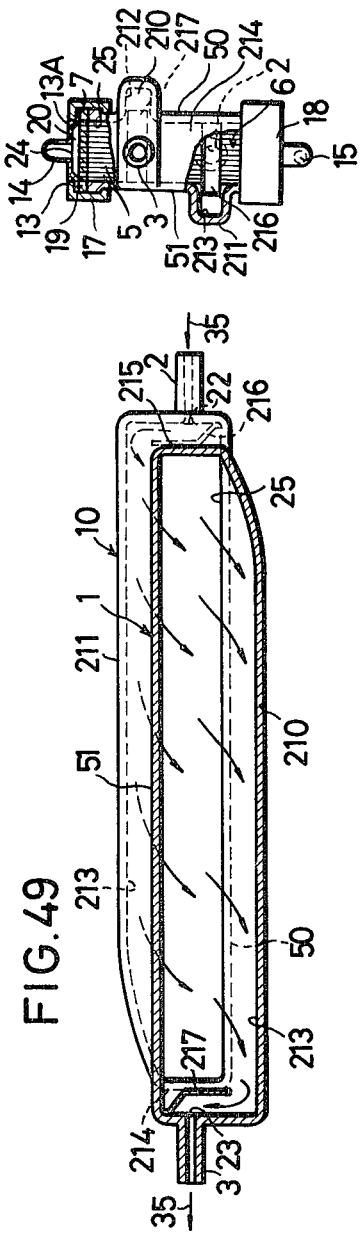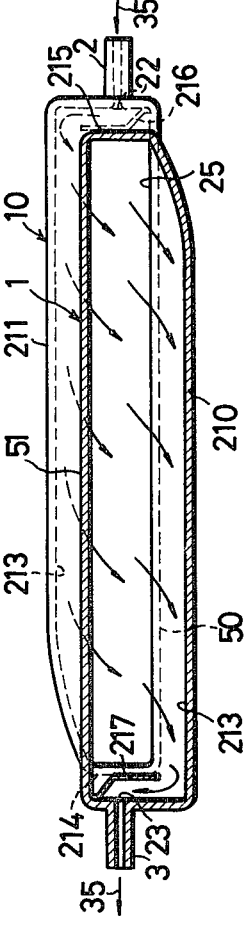

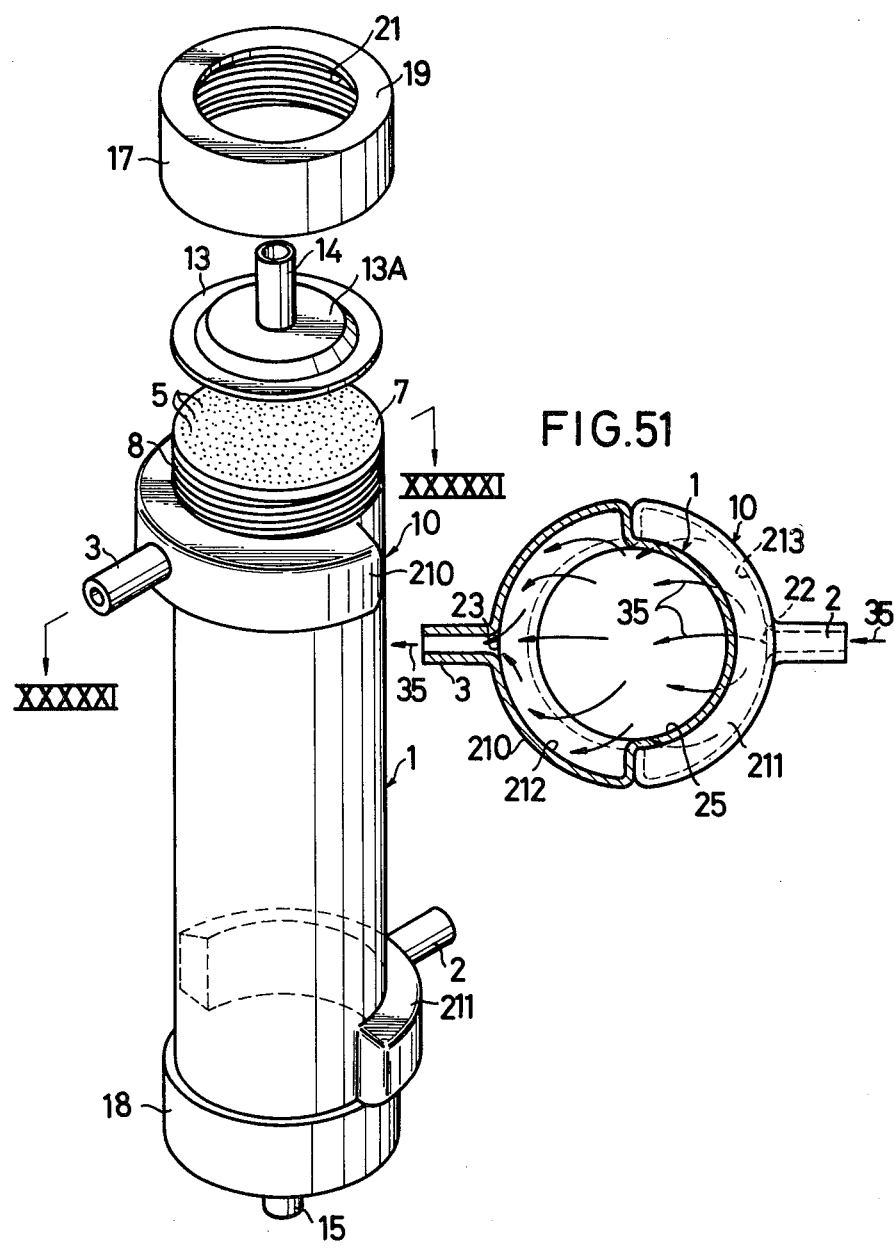

HOLLOW FIBER PERMEABILITY APPARATUS

BACKGROUND OF THE INVENTION

1. Field of the Invention

This invention relates generally to a hollow-fibre permeability apparatus, and more particularly to hollow-fibre permeability apparatus in which a permeating region of a housing contains a bundle of hollow fibres, and materials can selectively permeate through the membranes formed by the permeable walls of the hollow fibres, between a fluid flowing in the open spaces of the bundle of hollow fibres, and another fluid flowing inside the follow fibres. The permeation may be based on the principles of osmosis, dialysis, ultrafiltration, reverse osmosis or the like.

2. Description of the Prior Art

For example, a conventional hollow-fibre permeability apparatus is used for blood dialysis in an artificial kidney, in which toxic materials are removed from the blood of a patient suffering from renal failure or medicinal poisoning. Such apparatus is also used in an artificial lung, in which oxygen and carbon dioxide are exchanged with each other to increase the blood oxygen content.

An example of a conventional hollow-fibre permeability apparatus will now be described.

FIG. 1 shows a hollow-fibre blood dialysis apparatus 10 for use as an artificial kidney. The apparatus 10 comprises a cylindrical housing 1 formed of suitable material such as a synthetic resin. The housing 1 is open at both ends. Upper and lower cylindrical enlarged-diameter portions 37 and 38 are formed integrally with the housing 1. An inlet tube 2 and an outlet tube 3 for dialysate are connected to the enlarged portions 38 and 37, respectively, so as to be diametrically opposite to each other. Screw threads 8 are formed on the outer cylindrical surfaces of the end portion of the enlarged portion 37 and of the end portion of the enlarged portion 38.

A permeating region 25 in the housing 1 is filled with a hollow-fibre bundle 6 which consists of numerous hollow fibres 5 packed closely to each other. The hollow fibres 5 are made of suitable material, such as cellulose, and are substantially of the same length as the housing 1. Normally, the bundle 6 consists of ten to fifteen thousand hollow fibres 5, which are about 0.3 mm in diameter. The total membrane area of the hollow fibres 5 for effective dialysis is about 1 m$^2$.

The end portions of the bundle 6 are potted in a potting material 7 such as polyurethane, silicone resin or epoxy resin. Upper and lower disc covers 13 contact the outer peripheral regions of the upper and lower surfaces of the potting material 7 in the upper and lower openings of the housing 1. Upper and lower fastening rings 17 and 18 are secured to the housing by the engagement of screw threads 21 with the screw threads 8, so that the potting material 7 and the disc covers 13 are held between the upper and lower ends of the housing 1 and inwardly directed flange portions 19 of the fastening rings 17 and 18. In this way the bundle 6 of hollow fibres 5 is fixed at both ends in the housing 1. The upper and lower ends of the hollow fibres 5 are cut so as to open flush with the upper and lower smooth surfaces of the potting material 7. The fastening rings 17 and 18 are formed of suitable material, such as a synthetic resin.

The upper and lower disc covers 13 also form blood inlet tube 14 and a blood outlet tube 15, respectively. The central regions 13A of the disc covers 13 are axially disposed to form circular compartments 20 adjacent to and communicating with the inlet and outlet tubes 14 and 15, and also communicating with the interiors of the hollow fibres 5.

When blood is to be dialysed by the apparatus 10, dialysate 35 is supplied into the housing 1 from the inlet tube 2, and blood 36 to be dialysed, from an artery of a patient, is supplied into the housing 1 from the inlet tube 14. The dialysate 35 is distributed in an annular space 22 defined by the enlarged portion 38, and then passes into the bundle 6 of hollow fibres 5. The dialysate 35 passes upwardly through gaps or open spaces between the hollow fibres 5, into an annular space 23 defined by the enlarged portion 37, and out of the housing 1 through outlet tube 3. On the other hand, the blood 36 is distributed into the upper openings of the hollow fibres 5 from an inlet opening 24 of the tube 14 and the upper compartment 20. The blood 36 flows downwardly through the hollow fibres 5, counter-currently to the dialysate 35, and passes out of the housing 1 through the lower openings of the hollow fibres 5, the lower compartment 20 and the outlet tube 15.

The blood 36 is dialysed through the membrane walls of the hollow fibres 5 by the action of the dialysate 35. Accordingly, metabolic wastes such as urea, uric acid and creatinine can be removed from the blood 36 into the dialysate 35. The purified blood 36 passes out of the housing 1, and is returned to a vein of the patient. When the dialysate 35 is pumped out from the outlet tube 3, the dialysate 35 has negative pressure compared with the blood 36, so that ultrafiltration is effected between the dialysate 35 and the blood 36, to remove excess water from the blood 36.

The hollow fibres 5 used in the blood dialysis apparatus 10 provide a relatively large effective surface area of membrane. Therefore, the apparatus 10 can smaller than conventional coil-type or plate-type blood dialysis apparatus. Thus, the blood priming volume can be smaller, which is beneficial to the patient during dialysis. The apparatus 10 is also easier to handle, and the hollow fibres 5 are superior in withstanding pressure and for ultrafiltration.

Since the blood dialysis apparatus 10 has many advantages as above described, it has become popular recently. However, the apparatus 10 has the following disadvantages.

Since the ten to fifteen thousand hollow fibres 5 are closely bundled in the housing 1, it is difficult for the dialysate 35 to pass uniformly through the whole of the bundle 6. It is experimentally proved that the dialysate flow rate is higher around the peripheral region of the bundle 6 adjacent to the inner surface of the housing 1, and the dialysis is extremely low in the central region of the bundle 6. It is also found that boundary layers are formed along the outer and inner surface of the hollow fibres 5 which reduce the dialysis efficiency.

SUMMARY OF THE INVENTION

Accordingly, it is an object of this invention to provide a hollow-fibre permeability apparatus in which at least one region of enlarged cross-section is formed in a housing to generate a flow component (hereinafter called "cross-flow") flowing across the bundle of hollow fibres, whereby fluid flow through the central region of the bundle is promoted, and the boundary layer formed on the surface of the hollow fibres can be effectively broken.

Another object of this invention is to provide a hollow-fibre permeability apparatus which includes an enlarged cross-section region having a particular shape and size to generate an effective cross-flow.

A further object of this invention is to provide a hollow-fibre permeability apparatus in which the cross-section of the housing is so shaped as efficiently to generate a cross-flow.

A still further object of this invention is to provide a hollow-fibre permeability apparatus in which fluid is recycled through the housing and thereby better permeability can be obtained.

According to the present invention there is provided a hollow-fibre permeability apparatus comprising: a housing having a permeating region; a bundle of permeable-wall hollow fibres disposed at least in said permeating region of said housing; at least one inlet tube for supplying a first fluid into said housing so as to pass into the spaces between said fibres; at least one outlet tube for withdrawing said first fluid from said housing; at least one portion of said housing in said permeating region being of enlarged cross-section relative to said bundle to define a space between said bundle and a wall of said housing into which at least part of said first fluid can pass in its passage from said inlet to said outlet tube; and means for passing a second fluid through said fibres such that materials selectively permeate through the walls of said fibres.

The above and other objects, features and advantages of this invention, will be apparent in the following detailed description of illustrative embodiments which are to be read in connection with the accompanying drawings.

BRIEF DESCRIPTION OF THE DRAWINGS

FIG. 5 is a graph showing the relationship between the dialysance of urea and the shape of one end portion of the enlarged cross-section portion;

FIG. 6 is a graph showing the relationship between the dialysance of urea and the shape of another end portion of the enlarged cross-section portion;

FIGS. 7A to 7F are enlarged cross-sectional views of enlarged cross-section portions which do not fall under this invention, in which the flows of the dialysate are shown;

FIGS. 11A to 11E are enlarged cross-sectional views of variations of the enlarged cross-section portion of the apparatus of FIG. 2 and FIG. 3, in which the flows of the dialysate liquid are shown;

FIG. 12 and FIG. 13 are cross-sectional views of modifications of the apparatus of FIG. 2 and FIG. 3, in which a housing has a sinusoidal form;

FIG. 16 is a cross-sectional view of a blood dialysis apparatus according to a second embodiment of this invention;

FIG. 17 is a cross-sectional view of an important part of a blood dialysis apparatus according to a third embodiment of this invention;

FIG. 25 is a partly exploded perspective view of a blood dialysis apparatus according to a fifth embodiment of this invention;

FIG. 26 is a cross-sectional elevational view taken along the line XXVI—XXVI of FIG. 25;

FIG. 27 and FIG. 28 are cross-sectional elevational views of modifications of the apparatus of FIG. 25;

FIG. 36 is a cross-sectional view of one modification of the housing in the apparatus of FIG. 25;

FIG. 37 is a partly exploded perspective view of a blood dialysis apparatus according to a sixth embodiment of this invention;

FIG. 38 is a cross-sectional view taken along the line XXXVIII—XXXVIII of FIG. 37;

FIG. 39 is a partly cross-sectional front view taken along the line XXXIX—XXXIX of FIG. 37;

FIG. 40 is a partly cross-sectional front view of one modification of the enlarged cross-section portion in the apparatus of FIG. 37;

FIG. 41 is a partly cross-sectional front view of an important part of another modification of the enlarged cross-section portion in the apparatus of FIG. 37;

FIG. 42 is a front view of an important part of a further modification of the enlarged cross-section portion in the apparatus of FIG. 37;

FIG. 43 is a partly exploded perspective view of one modification of the apparatus of FIG. 37;

FIG. 44 is a partly cross-sectional front view of the apparatus of FIG. 43;

FIG. 45 is a partly cross-sectional elevational view of the apparatus of FIG. 44;

FIG. 46 is a cross-sectional view taken along the line XXXXVI—XXXXVI of FIG. 44;

FIG. 47 is a partly cross-sectional front view of another modification of the apparatus of FIG. 37;

FIG. 48 is a partly cross-sectional side view of the apparatus of FIG. 47;

FIG. 49 is a cross-sectional view taken along the line XXXXIX—XXXXIX of FIG. 47;

FIG. 50 is a perspective view of a further modification of the apparatus of FIG. 37;

FIG. 51 is a cross-sectional view taken along the line XXXXXI—XXXXXI of FIG. 50.

DESCRIPTION OF THE PREFERRED EMBODIMENTS

Figure 1:
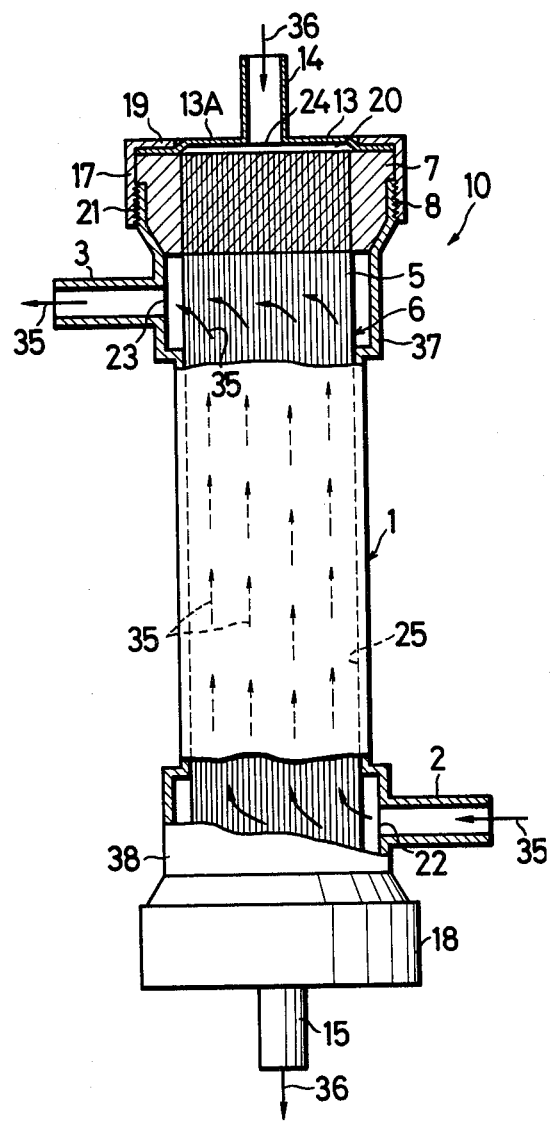
FIG. 1 is a partly broken away front view of a conventional blood dialysis apparatus for an artificial kidney.

Preferred embodiments as applied to an artificial kidney will now be described with reference to the drawings. In these embodiments, the parts which correspond to the parts in the apparatus 10 of FIG. 1, are denoted by the same reference numerals, and are not described in detail hereinafter.

A first embodiment will be described with reference to FIGS. 2 to 18.

Figure 2:
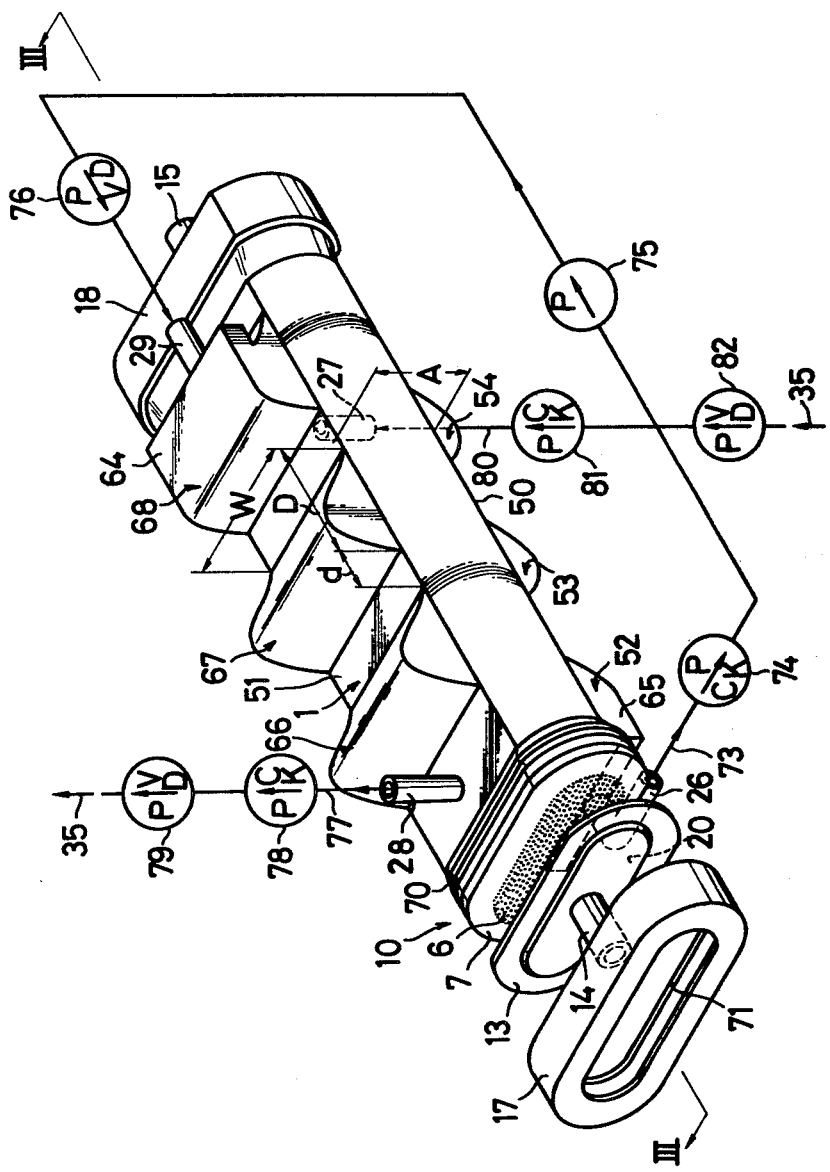
FIG. 2 is a partly exploded perspective view of a lateral-type blood dialysis apparatus for an artificial kidney and according to a first embodiment of this invention.
Figure 3:
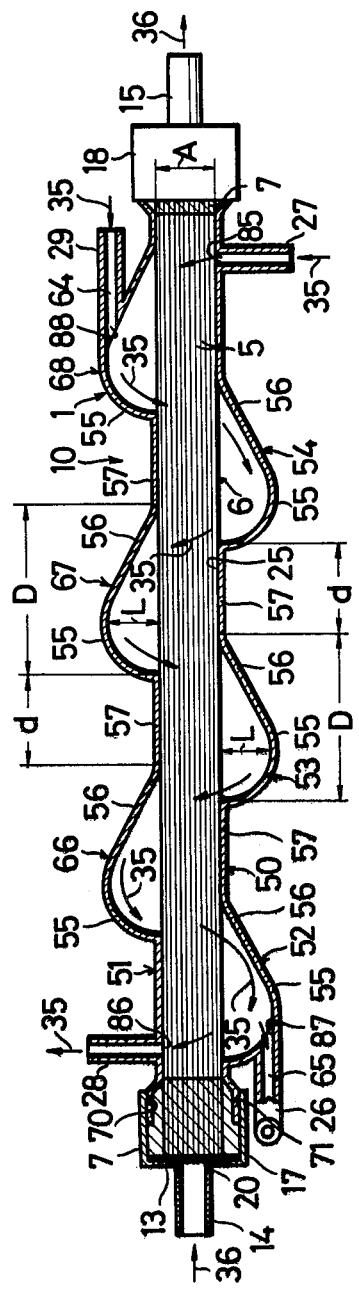
FIG. 3 is a cross-sectional view taken along the line III—III of FIG. 2.

FIGS. 2 and 3 show a blood dialysis apparatus 10 comprising a housing 1 of generally oblong cross-section whose short sides are semicircular. Compartments 20 defined by covers 13 have shapes similar to the cross-section of the housing 1. Accordingly, the compartments 20 have no angular corners where blood is liable to stagnate, and so blood can pass through the housing 1 without forming clots. The housing 1 may alternatively have an elliptical cross-section or a rectangular cross-section with four rounded corners. As a further alternative, it may have a square cross-section with or without rounded corners.

Some enlarged cross-section portions are formed in opposite sides 50 and 51 of the housing 1, which extend over the width W of the sides 50 and 51. In this embodiment, three enlarged cross-section portions 52, 53 and 54 are formed in one side 50 with intervening spaces of $d$, and three enlarged cross-section portions 66, 67 and 68 are formed in the other side 51 similarly with intervening spaces of $d$. The upper enlarged cross-section portions 66, 67 and 68, and the lower enlarged cross-section portions 52, 53 and 54 are alternately arranged. All of the enlarged cross-section portions 52, 53, 54, 66, 67 and 68 have the same shape. For example, referring to the enlarged cross-section portion 67, it consists of a curved wall 55 and a substantially flat or slightly concave wall 56 adjacent to the curved wall 55 (FIG. 3). The length of the enlarged cross-section portion 67 is D in the lengthwise direction of the bundle 6 of hollow fibres 5. The height of the enlarged cross-section portion 67 is L in the direction perpendicular to the lengthwise direction of the bundle 6. The bundle 6 is supported by the flat, intervening support portions 57 having the length d, in the housing 1.

The enlarged cross-section portions 52, 53, 54, 66, 67 and 68 function to generate the cross-flow of the dialysate, which travels back and forth through the bundle 6. The relationships between the length D thereof, the depth A of the bundle 6 and the length $d$ of the flat support portion 57 are represented by:

$$\tfrac{1}{4} A \leq L \leq 4A \ldots \tag{1}$$

$$A \leq D \leq 12A \ldots \tag{2}$$

$$0 \leq d \leq D \ldots \tag{3}$$

It has been proved that the cross-flow of the dialysate can be effectively generated, if the above relationship are fulfilled. In the embodiment of FIGS. 2 and 3, L ≈ A, D ≈ 3A and D ≈ 2d. The flat support portions 57 are between the adjacent enlarged cross-section portions 66 and 67, 67 and 68, 52 and 53, and 53 and 54.

An outlet tube 28 for discharging the dialysate is formed to the left of the enlarged cross-section portion 66, and an inlet tube 27 for supplying the dialysate is formed to the right of the enlarged cross-section portion 54, in the housing 1 of the apparatus 10. An inlet portion 64 for recycling dialysate having a slit opening 88, is formed integrally with the enlarged cross-section portion 68 or is attached demountably to the enlarged cross-section portion 68, to supply recycled dialysate tangentially to the enlarged cross-section portion 68. An inlet tube 29 is attached to the inlet portion 64. Similarly, an outlet portion 65 for recycling dialysate having a slit opening 87, is formed integrally with the enlarged cross-section portion 52 or is attached demountably to the enlarged cross-section portion 52, to discharge recycled dialysate tangentially to the enlarged cross-section portion 52. An outlet tube 26 is attached to the outlet portion 65. Since the inlet portion 64 and the outlet portion 65 have slit, not circular openings 88 and 87, respectively, a laminar flow of the dialysate, which can travel uniformly back and fourth through the bundle 6, can be obtained. A recycle tube 73 is connected to the outlet tube 26 for recycling dialysate. Further, the recycle tube 73 is connected through a check valve 74, a recycle pump 75 and a flow-rate adjusting valve 76 to the inlet tube 29. The recycle pump 75 may be a centrifugal pump, an axial-flow pump, a reciprocating pump, or a gear pump.

A discharge tube 77 is connected to the outlet tube 28 for discharging dialysate. Further, the discharge tube 77 is connected through a check valve 78 and a flow-rate adjusting valve 79 to a dialysate discharge tank (not shown). On the other hand, a supply tube 80 is connected to the inlet tube 27 for supplying dialysate. Further, the supply tube 80 is connected through a check valve 81 and a flow-rate adjusting valve 82 to a dialysate supply tank (not shown). The tubes 73, 77 and 80 are formed of synthetic resin, such as polyvinyl chloride. The inner surfaces of the tubes 73, 77 and 80 may be coated with silicone.

As described above, the corss-section of the housing 1 is oblong. Accordingly, both end portions of the bundle 6 and also potting material 7 have a similar oblong cross-section. Moreover, both covers 13 and fastening rings 17 and 18 have cross-sectional shapes similar to the oblong cross-section of the housing 1. Grooves 70 are formed in the outer circumferential surfaces of both end portions of the housing 1, and ridges 71 are formed on the inner circumferential surfaces of the fastening rings 17 and 18. By pushing the fastening rings 17 and 18 onto the end portions of the housing 1, the ridges 71 of the fastening rings 17 and 18 click into the grooves 70 of the end portions of the case 1, as shown in FIG. 3, so that the potting material 7 and the covers 13 are held between the housing 1 and the fastening ring 17 and 18. When the end portions of the housing 1 and the fastening ring 17 and 18 have circular cross-sections, they can be screwed to each other. In such a case, the bundle 6 between the end portions of the case 1 will conform to the contour of the permeating region 25 of the housing 1, which is oblong in cross-section, since the bundle 6 is flexible.

It is preferable that the relationship between the width W of the permeating region 25 and the depth A thereof is W = kA ( 1<k<40). From the viewpoint of effective generation of cross-flow, k = 1.5 to 20 is preferable, and k = 2 to 10 is more preferable. The cross-sectional area of the permeating region 25 is about 15 to 30 cm$^2$. For example, it may be 20 cm$^2$. The space occupied by the hollow fibres 5 in the permeating region 25 is about 10 to 60 volume percent. For example, it may be 35%. Therefore, the space available for dialysate in the permeating region 25 is about 40 to 90 volume percent. For example, it may be about 65%.

The enlarged cross-section portions 52, 53, 54, 66, 67 and 68 have a particular shape to generate the cross-flow. Next, referring to the enlarged cross-section portion 67, various particular shapes will be described with reference to FIGS. 4A to 4C.

Figure 4A:
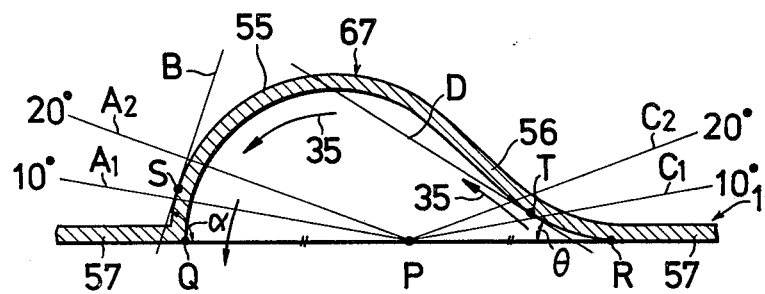
FIGS. 4A to 4C are enlarged cross-sectional views of modifications of an enlarged cross-section portion in the apparatus of FIG. 2 or FIG. 3, in which the flows of the dialysate are shown.

A point Q is the point at which the curved wall 55 of the enlarged cross-section portion 67 intersects with the flat support portion 57 of the housing 1, or more precisely at which the inner surface (line) of the curved wall 55 intersects with the inner surface (line) of the flat support portion 57. A point R is the point at which the flat wall 56 of the enlarged cross-section portion 67 intersects with the flat support portion 57 of the housing 1, or more precisely at which the inner surface (line) of the flat wall 56 intersects with the inner surface (line) of the flat support portion 57. A point P is the middle point between the point Q and R. FIG. 4A is a cross-sectional view taken along the plane defined by the lengthwise direction of the bundle 6 and the height direction of the enlarged cross-section portion 67. On the above-defined plane, a line $A_1$ is drawn extending to the left (downstream relative to the flow of dialysate 35), from the middle point P, at an angle of 10° to the surface of the flat support portion 57, and a line $A_2$ is drawn extending to the left from the middle point P at an angle at 20° to the surface of the flat support portion 57. A tangent line B to the curved wall 55 is drawn at an arbitrary point S on the curved wall 55 between the lines $A_1$ and $A_2$. An angle α is obtained by intersection of the line B with the line of the flat support portion 57. Similarly, on the above-defined plane, a line $C_1$ is drawn extending to the right (upstream relative to the flow of dialysate 35), from the middle point P at an angle of 10° to the surface of the flat support portion 57, and a line $C_2$ is drawn extending to the right from the middle point P at an angle of 20° to the line of the surface of the flat support portion 57. Another tangent line D to the flat wall 56 is drawn at an arbitrary point T on the flat wall 56 between the lines $C_1$ and $C_2$. Another angle θ is obtained by intersection of the line D with the line of the flat support portion 57.

As a result of detailed investigations, it has been found that highly effective cross-flow can be obtained when the following relationships are fulfilled for the angles α and θ:

$$30° \leq \alpha \leq 90° \ldots \quad (4)$$

$$5° \leq \theta \leq 80° \ldots \quad (5)$$

Within the above ranges, the "channelling" of the dialysate 35 along the wall of the housing 1 is effectively reduced, so that the flow component of the dialysate 35 crossing through the bundle 6 is increased. This will be described in detail in examples of experiments described below.

Within the range 45° ≤ α ≤ 90°, particularly good results can be obtained. As shown in FIG. 4A, the dialysate 35 flows along the inner surface of the enlarged cross-section portion 67, and then travels through the bundle 6 at a desired angle to the lengthwise driection of the bundle 6. Generally, the closer the angle α is to 90°, the greater the cross-flow component of the dialysate 35 obtained. Since the dialysate 35 flows back and forth across the bundle 6, the dialysis efficiency is raised. Moreover, since the flow of the dialysate 35 collides with the outer surfaces of the hollow fibres 5, and results in the development of turbulence, boundary layers on the outer surfaces of the hollow fibres 5 can be broken up. As a result large differences in the concentrations of materials between the outer and inner surface regions of the hollow fibres 5 can be maintained. This promotes the dialysis.

Within the range 5° ≤ θ ≤ 60°, particularly good results can be obtained. As shown in FIG. 4A, the dialysate 35 from the preceding enlarged cross-section portion 54 (FIG. 3) can flow smoothly into the enlarged cross-section portion 67 without resistance. The flow direction of the dialysate 35 is changed along the inner surface of the enlarged cross-section portion 67, and then the deflected dialysate 35 flow crosses through the bundle 6, as above described.

Since effective cross-flow can be obtained when the above relationships (4) and (5) are simultaneously fulfilled for the angles θ and Γ, it is preferable that the shape of the enlarged cross-section portion 67 is determined in accordance with the relationships (4) and (5). How much the angle α contributes to the cross-flow, depends on the angle θ. Generally, the nearer the angle α is to 90°, the better the results.

Figure 4B:
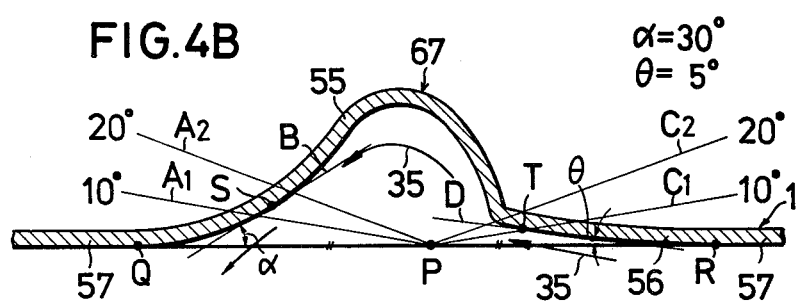
Figure 4C:
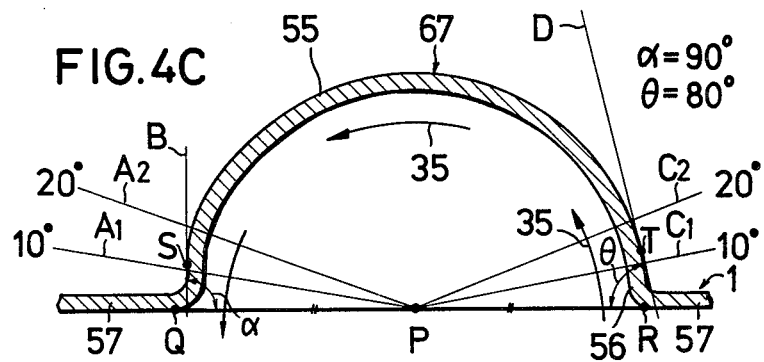

FIG. 4B shows the case where the angles α and θ are the minima of the ranges of the relationships (4) and (5). It will be understood that effective cross-flow can be obtained even in the case of FIG. 4B. FIG. 4C shows the case where the angles α and θ are the maxima of the ranges of the relationships (4) and (5). Similarly, it will be understood that effective cross-flow can be obtained even in the case of FIG. 4C.

The angles α and θ are decided by the tangent lines B and D, respectively. On the other hand, it has been proved that the shapes of the enlarged cross-section portion 67 defined between the line $A_1$ and the flat support portion 57, and between the line $C_1$ and the flat support portion 57, show little influence on the generation of the cross-flow, and accordingly they may, for example, be flat, concave, or convex. It is preferable that the shape of the enlarged cross-section portion 67 defined between the lines $A_2$ and $C_2$ is convex to the bundle 6, so that the dialysate 35 can flow smoothly along and be deflected by the inner surface of the enlarged cross-section portion 67.

As shown in FIG. 3, the bundle 6 is disposed between the upper enlarged cross-section portion 66, 67 and 68, and the lower enlarged cross-section portion 52, 53 and 54 which are displaced longitudinally and alternately relative to each other. Accordingly, the dialysate 35 from one enlarged cross-section portion tends to flow into the next opposite enlarged cross-section portion after crossing through the bundle 6. Thus the dialysate 35 can flow smoothly back and forth through the bundle 6 in the housing 1.

Next, a method of using the blood dialysis apparatus 10 according to the first embodiment of this invention will be described.

Fresh dialysate 35 is supplied into the inlet tube 27 through the supply tube 80, the check valve 81 and the flow-rate adjusting valve 82 from the dialysate supply tank. The flow rate of the dialysate 35 is adjusted, for example, to 200 ml/min. by the flow-rate adjusting valve 82. The dialysate 35 is supplied into the housing 1 from opening 85 of the tube 27, and flows to the left forming a zigzag stream through the housing 1.

When the housing 1 is sufficiently charged with the dialysate 35, the recycling pump 75 is started. The dialysate 35 continues to be supplied into the housing 1 through the supply tube 80. Accordingly, the flow rate of the dialysate 35 discharged out of the outlet tube 28 is equal to the flow rate of the dialysate 35 supplied into the housing 1 through the inlet tube 27. The dialysate 35 is discharged through the check valve 78 and the flow-rate adjusting valve 79 into the dialysate discharge tank.

Due to the recycling pump 75, the dialysate 35 passes to the left through the permeating region 25 from the recycling inlet tube 29, and is led out into the recycling tube 73 through the outlet opening 87 and the outlet tube 26. The dialysate 35 is then again supplied into the housing 1 through the check valve 74, the pump 75, the flow-rate adjusting valve 76 and the inlet tube 29 for recycling. For example, the flow rate of the recycling dialysate 35 may be 500 ml/min.

First, the dialysate 35 from the inlet opening 88 passes into the enlarged cross-section portion 68, and flows along the inner surface of the enlarged cross-section portion 68. Then, the dialysate 35 flows across through bundle 6, and passes into the enlarged cross-section portion 54, because it offers less resistance to the flow than the permeating region 25. The dialysate 35 turns along the inner surface of the enlarged cross-section portion 54 and again flows across the bundle 6. Since the enlarged cross-section portions are alternately arranged, the dialysate 35 flows undulately through the housing 1, as a whole, counter-currently to the blood 36 in the hollow fibres 5. The flow of the dialysate 35 has a considerable cross-flow component normal to length of the bundle 6.

Since the inlet opening 88 of the inlet tube 29 is a slit, extending over the width of the permeating region 25, uniform flow of the dialysate 35 relative to the bundle 6 can be obtained. Moreover, since the outlet opening 87 of the outlet tube 26 is also a slit extending over the width of the permeating region 25, the dialysate 35 can be uniformly collected and discharged out of the housing 1. Thus, cross-flow of the dialysate 35 can be obtained throughout the bundle 6.

The fresh dialysate 35 is supplied into the housing 1 through the inlet opening 85, and the dialysate 35 is discharged from the outlet opening 86 with substantially the same flow rate as for the supply of fresh dialysate 35. The cross-flow of the dialysate 35 from the inlet tube 27 collides with the hollow fibres 5, so that turbulent flows are developed.

As above described, highly effective cross-flow of the dialysate 35 is developed in the housing 1. The boundary layers formed along the membranes of the hollow fibres 5 are broken up by the turbulences in the dialysate 35. Accordingly, the effective difference in the concentration of materials in the blood and in the dialysate 35 can be maintained with the membrane between. As a result, good dialysis efficiency can be obtained. The cross-flow of the dialysate 35 rapidly penetrates into the central portion of the bundle 6, so turbulent flow is developed there. The flow rate of the dialysate 35 passing through the central portion of the bundle 6 can be much larger than for the conventional apparatus of FIG. 1.

When the recycling rate of the dialysate 35 is increased, the dialysate 35 flows through the permeating region 25 at a much higher rate, so that the boundary layers formed on the membranes of the hollow fibres 5 can be more effectively broken. The extent of the breaking of the boundary layers can be varied with the recycling rate of the dialysate 35.

Next, the relationships between the angles $\alpha$ and $\theta$ and the dialysis efficiency or dialysance will be described with reference to experimental results.

The experimental conditions are as follows:

Hollow Fibres
  Kind: Cuprophane (cellulose)
  Outer diameter: 247 $\mu$m (dry)
  Inner diameter: 215 $\mu$m (dry)
  Effective length: 19 cm
  Number of fibres: 7800
  Total membrane area of bundle of hollow fibres: 1m$^2$
Housing
  Cross-section taken along the direction perpendicular to the length of the hollow fibres:

7.3 cm × 1.75 cm (12.8 cm$^2$)

Packing density of hollow fibres (volume of hollow fibres swelled with dialysate relative to volume of permeating region to be charged with hollow fibres);
  42 volume percent
Permeating region
  Length D: 3.8 cm
  Height L: 1.2 cm
  Distance between the adjacent enlarged cross-section portions $d$: 2.3 cm
  The dialysance D (as defined by Wolff), is represented by the following formula:

$$Db = Qb \cdot \frac{Cbi - Cbo}{Cbi - Cdi} \quad (6)$$

where $Db$ represents a dialysance for blood, $Qb$ a flow rate of blood, $Cbi$ a concentration of the blood at the inlet opening, $Cdi$ a concentration of the dialysate at the inlet opening, and $Cbo$ a concentration of the blood at the outlet opening.

The dialysance $Dd$ for dialysate is represented by the following formula:

$$Dd = Qd \cdot \frac{Cdo - Cdi}{Cbi - Cdi} \quad (7)$$

where $Qd$ represents a flow rate of dialysate, and $Cdo$ a concentration of the dialysate at the outlet opening. Normally, $Db$ is mainly employed.

At $Qb = 200$ ml/min and $Qd = 500$ ml/min, the following results were obtained from experiments:

| $\alpha$ (degrees) | $\theta$ (degrees) | Dialysance of urea(ml/min) |
|---|---|---|
| 17 | 40 | 139 |
| 17 | 12 | 141 |

-continued

| α (degrees) | θ (degrees) | Dialysance of urea(ml/min) |
|---|---|---|
| 17 | 30 | 141 |
| 20 | 45 | 137 |
| 20 | 4 | 139 |
| 30 | 4 | 141 |
| 30 | 40 | 160 |
| 30 | 90 | 133 |
| 40 | 40 | 169 |
| 40 | 45 | 167 |
| 40 | 110 | 140 |
| 50 | 4 | 148 |
| 50 | 45 | 170 |
| 50 | 110 | 144 |
| 60 | 4 | 156 |
| 60 | 36 | 172 |
| 60 | 10 | 170 |
| 70 | 5 | 148 |
| 70 | 32 | 175 |
| 70 | 10 | 150 |
| 85 | 4 | 149 |
| 85 | 35 | 176 |
| 85 | 105 | 141 |
| 90 | 5 | 162 |
| 90 | 30 | 180 |
| 90 | 90 | 150 |
| 100 | 30 | 150 |
| 100 | 45 | 142 |
| 100 | 110 | 130 |

The above results are plotted in FIGS. 5 and 6. FIG. 5 shows the relationships between the angle α and the dialysance of urea within the range $5° \leq \theta \leq 80°$. In FIG. 5, circules represent the above data, and black spots represent the results of other experiments. FIG. 6 shows the relationship between the angle θ and dialysance of urea within the range $30° \leq \alpha \leq 90°$. In FIG. 6, similarly, circles represent the above data, and black spots represent the results of other experiments.

As apparent from FIG. 5, excellent dialysance of over about 150 ml/min can be obtained for $30° \leq \alpha \leq 90°$ when $5° \leq \theta \leq 80°$. If $45° \leq \alpha \leq 90°$, outstanding results can be obtained. As apparent from FIG. 6, excellent dialycance can be obtained for $5° \leq \theta \leq 80°$ when $30° \leq \alpha \leq 90°$. If $5° \leq \theta \leq 60°$, and more preferably $10° \leq \theta \leq 45°$, outstanding results can be obtained.

Accordingly, it has been experimentally proved that an effective dialysis apparatus can be obtained, when the relationships (4) and (5) are fulfilled for angles α and θ. On the other hand, it is apparent that dialysance is reduced when the angles α and θ are outside the ranges represented by relationships (4) and (5). FIGS. 7A to 7F show such examples, in which the dialysate flows unfavourably in the enlarged cross-section portion of the housing 1. In FIGS. 7A and 7B, where α is too small, "channelling" is apt to occur. In FIGS. 7B and 7C, where θ is too large and too small, respectively, vortex flow is apt to occur in the enlarged cross-section portion, and so effective cross-flow cannot be obtained. In FIGS. 7D to 7F, where α is too large and θ is too large or too small, vortex flow occurs at the downstream and upstream side of the enlarged cross-section portion 67. Accordingly, the component of the cross-flow is reduced, and "channelling" results.

It has been found that the cross-flow is very effectively generated in the enlarged cross-section portions 52, 53, 54, 66, 67 and 68 within the ranges of the height L and the length D, as represented by the relationships (1) and (2).

FIG. 11A shows a case where the relationship (1) is not fulfilled, the height L being under ¼ A. Since the height of the enlarged cross-section portions 52, 53, 66 and 67 is relatively small, the dialysate 35 almost flows along the bundle 6, and the cross-flow component crossing the bundle 6 is very small, even although the sialysate does enter the enlarged cross-section portions.

FIG. 11B shows a case where the relationship (2) is not fulfilled, the length D being under A. Since the size of the enlarged cross-section portions 53, 66 and 67 is very small in comparison with the bundle 6, the cross-flow of the dialysate 35 cannot reach the central portion of the bundle 6. This is not favourable.

FIG. 11C shows a case where the relationship (1) is not fulfilled, the height L being over 4A. Since the height of the enlarged cross-section portions 53, 66 and 67 is relatively large, a vortex flow occurs in part of the enlarged cross-section portions 53, 66 and 67, as shown, and so the dialysate 35 cannot flow smoothly. Accordingly, the cross-flow across the bundle 6 is reduced.

Figure 11D:
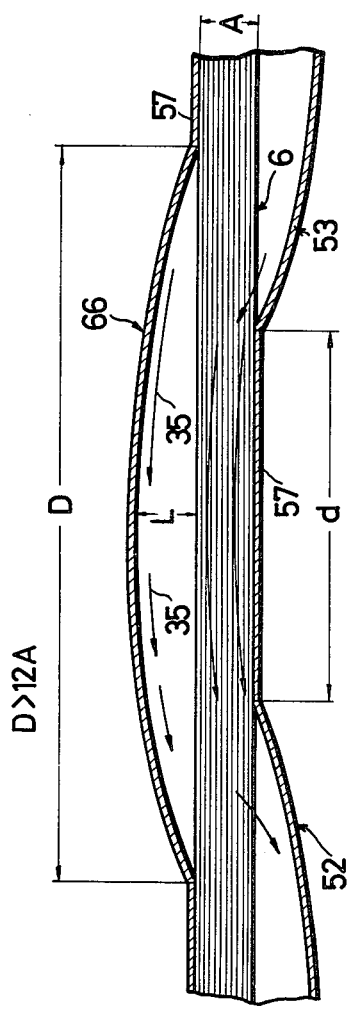

FIG. 11D shows a case where the requirement (2) is not fulfilled, the length D being over 12A. Since the enlarged cross-section portion 66 is too long, the flow of the dialysate 35 from the enlarged cross-section portion 66 yields to the flow which is occurring along the bundle 6. Accordingly, cross-flow of the dialysate 35 cannot effectively occur.

Figure 11E:
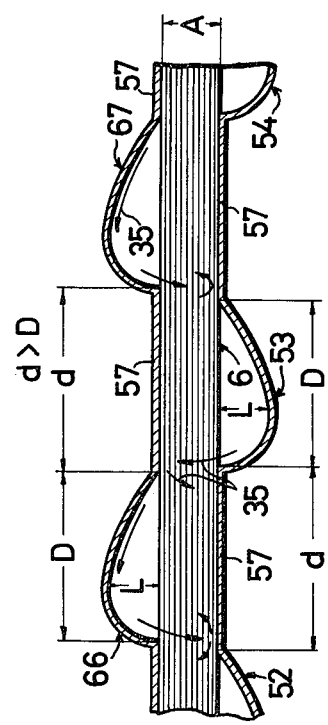

FIG. 11E shows a case where the relationships (1) and (2) are fulfilled, but the relationship (3) is not fulfilled; the distance d being greater than D. A part of the dialysate 35 flowing upward through the bundle 6 from the enlarged cross-section portion 53 collides with the lefthand end of the flat support portion 57 of the housing 1, and this changes the course of the flow. Accordingly, it is not possible for the whole flow of the dialysate 35 from the enlarged cross-section portion 53 to be led smoothly into the enlarged cross-section portion 66. This interferes with the generation of intensive cross-flow of the dialysate 35 by the enlarged cross-section portion 66. Accordingly, it is preferable to fulfil the relationship (3) to generate effective cross-flow.

The distance d may be zero. FIG. 12 shows such a case. Curved portions 83 are formed between the enlarged cross-section portion 52 and 53, and between the enlarged cross-section portion 53 and 54 in the lower side 50 of the housing 1. The curved portions 83 are contiguous to the enlarged cross-section portion 52, 53 and 54 to form sinusoidal spaces. Similarly, curved portions 84 are formed between the enlarged cross-section portions 66 and 67, and between the enlarged cross-section portions 67 and 68 in the upper side 51 of the housing 1. The curved portions 84 are contiguous to the enlarged cross-section portions 66, 67 and 68 to form another sinusoidal space. The support portions 57 of the curved portions 83 and 84, supporting the bundle 6 face the apices of the enlarged cross-section portions 52, 53, 54, 66, 67 and 68, respectively. The dialysate 35 can therefore flow smoothly into the enlarged cross-section portions and flow smoothly across the bundle 6 from the enlarged cross-section portions.

FIG. 13 shows a modification to the case of FIG. 12. The enlarged cross-section portion consist of a gently curved portion 89 and a steeply curved portion 90, respectively. The dialysate 35 is led along the gently curved portion 89 and is sharply turned along the steeply curved portion 90 to flow across the bundle 6. Accordingly, the cross-flow of the dialysate 35 can be effectively generated.

Figure 8:
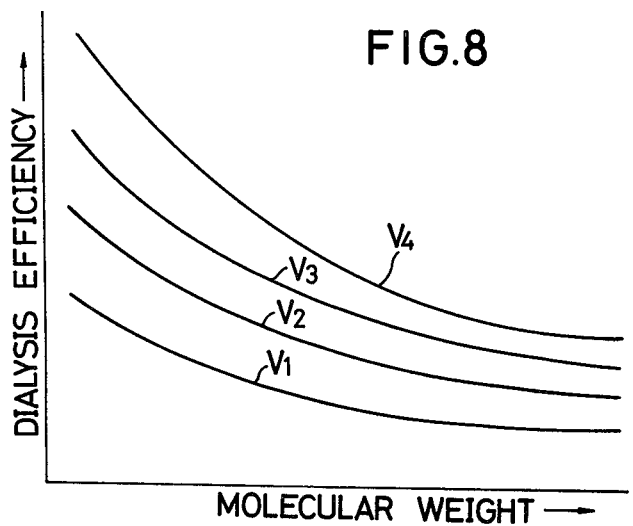
FIG. 8 is a graph showing the relationships between the dialysis efficiency, the molecular weight and the flow rate of the dialysate.
Figure 9:
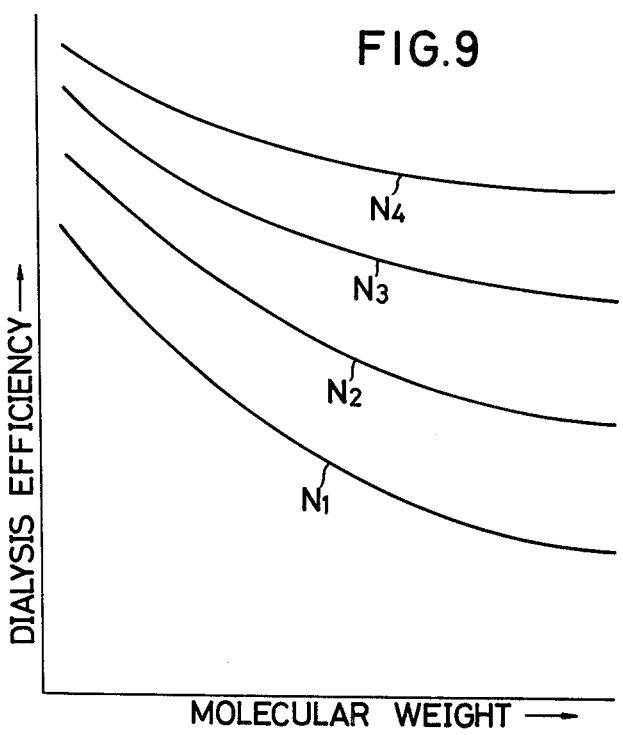
FIG. 9 is a graph showing the relationships between the dialysis efficiency, the molecular weight and the circulation speed of the dialysate.

Normally the dialysis efficiency varies with the flow rate of the dialysate and the molecular weight of materials to be dialised. FIG. 8 shows the relationships between the flow rates of the dialysate ($V_1 < V_2 < V_3 < V_4$), the molecular weight of the materials to be dialised, and the dialysis efficiency. As apparent from FIG. 8, the dialysis efficiency decreases with increase of the molecular weight of the material to be dialised. The higher the flow rate of the dialysate, the greater the efficiency, especially for lower molecular weight materials. However, it has been found that the above-described phenomenon, which is detrimental to patients well-being because of unbalanced dialysis, can be removed by recycling most of the dialysate, so that only a part of the dialysate is discharged. FIG. 9 shows the effects of recycling on the dialysis efficiency. In FIG. 9, a curve $N_1$ shows the case where the dialysate makes only a single pass through the apparatus, at the high flow rate which corresponds to the flow rate $V_4$ of FIG. 8. The relationship between the dialysis efficiency and the molecular weight of the material to be dialised, is similar to the corresponding relationship in FIG. 8. As apparent from the curve $N_1$ of FIG. 9, the smaller the molecular weight of the material to be dialised, the faster the material is dialised.

When the dialysate is recycled in the apparatus, the concentration of smaller molecular weight material becomes higher in the recycled dialysate. Accordingly, the difference in the concentration between the blood and the dialysate for smaller molecular weight material becomes smaller, which in effect prevents too rapid dialysis for smaller molecular weight material, so that the unbalance in the dialysis efficiency for different molecular weight materials is compensated.

In embodiments of this invention, the cross-flow components and hence the dialysis efficiency increase with increase in the flow rate of the recycled dialysate. Moreover, the unbalance of the dialysis efficiency, caused by differences in molecular weight, decreases with the increase of the flow rate of the recycled dialysate, as shown by curves $N_2$, $N_3$ and $N_4$ in FIG. 9.

As apparent from the above, with control of the discharge, supply and recycling of the dialysate, desired dialysis of different materials can be effected, and dialysis efficiency per unit volume of dialysate can be raised.

In FIGS. 8 and 9, it is assumed that the amounts of materials having different molecular weights, contained in the blood, are nearly equal to each other, and that the corresponding materials are not initially contained in the dialysate.

The dialysis efficiency of the conventional hollow-fibre type blood dialysis apparatus is good in comparison with the coil-type dialysis apparatus and the plate-type dialysis apparatus. Accordingly, increasing the flow rate of the dialysate has not been seriously considered, because unbalance of the dialysis efficiency occurs increasingly with increasing flow rate of the dialysate. Moreover, in the conventional hollow-fibre type blood dialysis apparatus, the so-called "channelling" phenomenon occurs increasingly with increasing flow rate, so a large amount of dialysate is wasted.

Moreover, it has hitherto been considered that the dialysis efficiency decreases with recycling of the dialysate, since the concentration of the dialysed materials increase in the dialysate which reduces the difference in their concentrations in the blood and in the dialysate.

In embodiments of the present invention in which cross-flow of the dialysate occurs, "channelling" does not occur, and the dialysis efficiency and the balance of the dialysis are improved with recycling of the dialysate. Moreover, there is little possibility of producing unfavourable effects on a patient, because the unbalance of the dialysis for different materials is rectified. It is also possible to control the unbalance of the dialysis by adjusting the recycling flow rate, in accordance with the physical conditions of the patient. In other words, the patient can be symtomatically treated.

It is preferable that the flow rate of the dialysate passing through the housing is 200 to 10000 ml/min, and more preferable that it is 400 to 5000 ml/min. It is preferable that the ratio of the flow rate of the supplied dialysate to the recycled dialysate is 1:50 to 1:0.5, more preferable that is 1:30 to 1:1. The dialysate may then be regenerated by passing through an adsorbent and recycled to the dialysis apparatus without supplying fresh dialysate.

Figure 10:
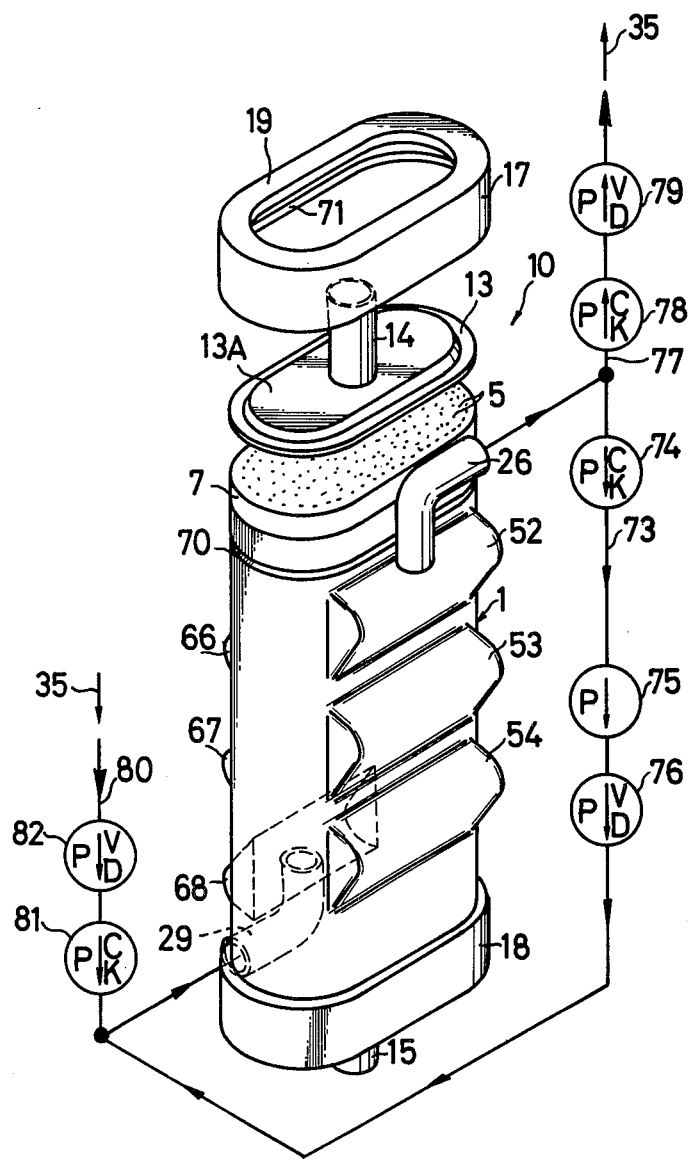
FIG. 10 is a partly exploded perspective view of a modification of the apparatus of FIG. 2 in which the method for supplying and withdrawing dialysate is modified.

The methods for supplying and discharging the fresh dialysate are not limited to the method shown in FIG. 2. FIG. 10 shows a modification of FIG. 2. The discharge tube 77 branches from the recycle tube 73, and the supply tube 80 is connected to the recycle tube 73. Thus, the apparatus is simplified by the changes in the connections of the discharge tube 77 and the supply tube 80, and can be operated in the same manner as the apparatus shown in FIG. 2.

Figure 14:
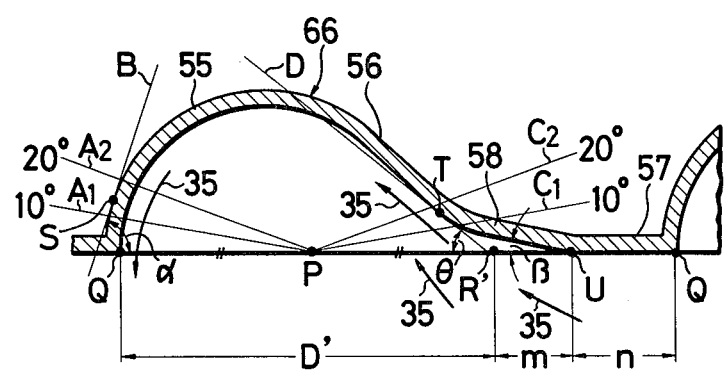
FIG. 14 and FIG. 15 are enlarged cross-sectional views of a further modification of an enlarged cross-section portion in the apparatus of FIG. 2 or FIG. 3.

Further, the enlarged cross-section portion 67 shown in FIG. 4A may be modified, as shown in FIG. 14. Referring to FIG. 14, a flat or straight portion 58 is formed between the enlarged cross-section portion 66 defining a substantial enlarged cross-section region, and the flat support portion 57 supporting the bundle 6. By the arrangement of the flat portion 58, more dialysate 35 can be led into the enlarged cross-section region 66. Thus, the flat portion 58 defines a lead-in region. Accordingly, the cross-flow becomes larger. The flat portion 58 is inclined at an angle $\beta$ to the lengthwise direction of the bundle 6 and intersects with the flat support portion 57 at a point U. The length of the flat portion 58 is $m$ in the lengthwise direction of the bundle 6. The length of the flat support portion 57, namely the distance between the point U and the point Q of the adjacent enlarged cross-section portion 67 is $n$, which corresponds to the above described length $d$. It is preferable that the lengths $m$, $n$ and the angle $\beta$ fulfil the following relationships:

$$\tfrac{1}{3} A \leq m \leq 6A \ldots \tag{8}$$

$$\tfrac{1}{3} A \leq n \leq 6A \ldots \tag{9}$$

$$0.1 \leq n/m \leq 10 \ldots \tag{10}$$

$$2° \leq \beta \leq 20° \ldots \tag{11}$$

where A represents the depth of the permeating region 25. In that case, it is assumed that the relationships (1) and (2) referring to the height L and length D of the enlarged cross-section portion 66 and fulfilled. More preferably $\tfrac{1}{2} A \leq m \leq 6A$, and $\tfrac{1}{2} A \leq n \leq 6A$.

Figure 15:
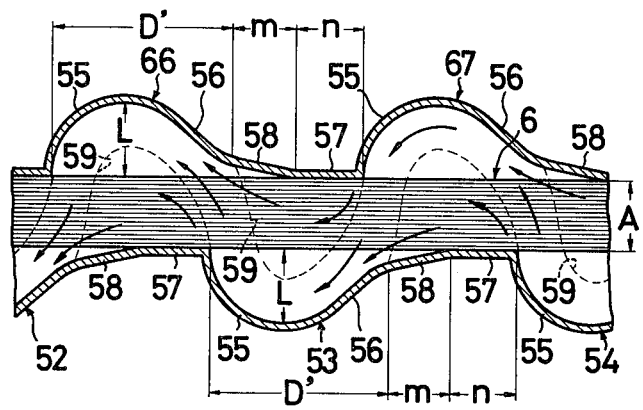

As shown in FIG. 15, in a region 59 surrounded by the flat support portion 57, the flat portion 58 and the dotted line, which is adjacent to a region at which the cross-flow is localised in FIG. 3, the dialysate 35 is guided by the lead-in region defined by the flat portion 58, and flows smoothly into the enlarged cross-section portion 66. Accordingly, the cross-flow is increased.

In the apparatus shown in FIGS. 3 and 4A, the dialysate 35 in the region 59 having poor cross-flow, cannot be effectively collected into the enlarged cross-section portion 66. On the other hand, the dialysate 35 in the region 59 can be effectively collected into the enlarged cross-section portion 66 by the flat portion 58 in the apparatus shown in FIG. 14.

When the length m is outside the relationship (8); namely when the length of the flat portion 58 is too large or too small, it is difficult effectively to collect the dialysate 35 into the enlarged cross-section portion 66 from the region 59. When the length n is outside the relationships (9) and (10), there is a similar disadvantage. For the determination of the length m or n, the relationship (10) should be considered. When the angle β is too small, and outside the range relationship (11), the apparatus of FIG. 14 is the same as that of FIG. 4A. When the angle β is too large, and outside the range of relationship (11), it is difficult to obtain the above-described effect. It is preferable that the angle β is smaller than the angle θ for the enlarged cross-section portion 66. The flat portion 58 is not always limited to the shape shown in FIG. 14, but may be concave or convex.

Next, a second embodiment of this invention will be described with reference to FIG. 16. This embodiment is different from the first embodiment in the shape of the enlarged cross-section portions and the method for recycling the dialysate. The parts which correspond to parts in the first embodiment are denoted by the same reference numerals and will not be described in detail.

Four lower enlarged cross-section portions 100, 101, 102 and 103, and three upper enlarged cross-section portions 104, 105 and 106 are provided alternately and longitudinally offset in the sides 50 and 51, respectively of the housing 1, extending over the width of the sides 50 and 51. An orifice 107 is formed in the side 50 of the housing 1 between the enlarged cross-section portions 101 and 102, extending over the width of the side 50 of the housing 1. The enlarged cross-section portions 100, 101 and 102, 103 are identical in shape. The enlarged cross-section portions 104 and 106 are identical in shape. The enlarged cross-section portions 100 to 106 consist of the flat wall 56 nearer the orifice 107 and the round or curved wall 55. The enlarged cross-section portion 105 consists of a pair of round or curved walls 108 and 109. The centre of the enlarged cross-section portion 105 faces the inlet opening 88 of the orifice 107 for the dialysate 35. Outlet tubes 110 and 111 having the slit-like openings 87 are formed to the left of the enlarged cross-section portion 104 and to the right of the enlarged cross-section portion 106 in the housing 1, respectively.

The inlet tube 29 for recycling dialysate 35 is connected to the orifice 107. The outlet tube 26 for recycling dialysate 35 is connected to the outlet tubes 110 and 111. The outlet tube 26 is bifurcated. The dialysate 35 is withdrawn from the central portion of the outlet tube 26. The outlet tube 28 for discharging the dialysate 35 is formed integrally with the enlarged cross-section portion 103, opposite to the outlet tube 111. The inlet tube 27 for supplying the dialysate 35 is formed integrally with the enlarged cross-section portion 100, opposite to the outlet tube 110.

The enlarged cross-section portions 100, 101, 102, 103, 104 and 106 are so shaped as to fulfil the above relationships (4) and (5) for the angles α and θ (see FIG. 4A). Although not shown in FIG. 16, the tangent lines B and D are drawn at the opposite ends of the enlarged cross-section portion 105. The angles α and θ defined between the support portion 57 and the line B, and between the support portion 57 and the line C fulfil the relationships (4) and (5). Moreover, the enlarged cross-section portions are designed to fulfil the relationships (1), (2) and (3).

The dialysate 35 flows through the housing 1 substantially in the same manner as in the first embodiment. The recycled dialysate 35 from the orifice 107 flow across the bundle 6, and is led into the enlarged cross-section portion 105. In the enlarged cross-section portion 105, the dialysate 35 is divided into two flows, leftward and rightward. Thereafter, the dialysate 35 flows as shown by the arrows in FIG. 16, and reaches the outlet openings 87. The dialysate 35 is led through the outlet tube 26 back into the inlet tube 29 by the recycle pump. Thus, the dialysate 35 recycles.

Since the orifice 107 has the slit-like opening 88 extending over the width of the permeating region 25, the dialysate 35 can flow uniformly through the bundle 6. Moreover, since the outlet opening 87 is slit-like, extending over the width of the permeating region 25, the dialysate 35 can be uniformly collected into the outlet openings 87. As a result, the dialysate 35 flows uniformly in a sinusoidal manner back and forth through the bundle 6 in the housing 1, and the cross-flow can be effectively generated.

In this embodiment, since the outlet openings 87 for recycling are formed at the opposite ends of the housing 1, and the inlet opening 88 is formed in the central portion of the housing 1, the dialysate 35 is sucked towards both of the outlet openings 87. The dialysate 35 to the left is flowing counter to the flow of the blood 36. The dialysate 35 to the right is flowing in the same direction as the blood 36. The distance between the inlet opening 88 and the outlet opening 87 is reduced to half the corresponding distance in the apparatus of FIG. 3. Accordingly, the cross-flow can be more intensive than in the apparatus of FIG. 3. In this embodiment, the cross-flow does not reduce in the direction of the outlet openings 87. The dialysate 35 is led very smoothly into each enlarged cross-section portion along the flat wall 56 of the enlarged cross-section portion and is turned along the curved wall 55 to flow nearly normally into the bundle 6. As the result, the dialysis efficiency is substantially improved.

Also in this embodiment, the enlarged cross-section portions 100 to 106 are designed to fulfil the relationships (1) to (5). Accordingly, the same effect as in the first embodiment can be obtained. In the embodiment shown in FIG. 16, a single path for the dialysate 35 can be used. Thus the dialysate 35 can be supplied from the inlet tube 29 and withdrawn via the outlet tube 26 from both ends of the housing 1. In this case, the tubes 28 and 27 are eliminated.

Next, a third embodiment of this invention will be described with reference to FIGS. 17 and 18.

This embodiment is different from the above described embodiments in construction of the enlarged cross-section portions. The parts which correspond to the parts in the above-described embodiments, are denoted by the same reference numerals and will not be described in detail.

In this embodiment, enlarged cross-section regions 129, 130, 131 and 132, which are formed inside the housing 1, are defined by curved walls 120, 122, 124, 126 and 128 and flat walls 121, 123, 125 and 127. The adjacent enlarged cross-section regiosns 129 and 130, and 131, and 132 are connected with each other by rectangular support portions 117, extending over the width of the housing 1. The bundle 6 is supported by the support portions 117. Since the enlarged cross-section regions 129, 130, 131 and 132 are shaped so as to fulfil the relationships (1) to (5), the dialysate 35 flows as shown by the arrows in FIG. 17, and effective cross-flow occurs.

Figure 18:
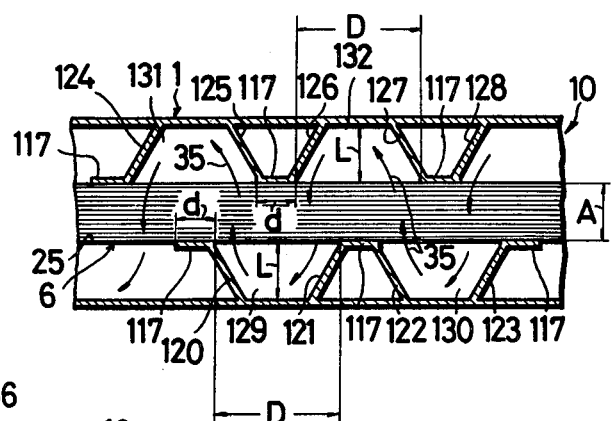
FIG. 18 is a cross-sectional view of an important part of one modification of the apparatus of FIG. 17.

FIG. 18 shows a modification of FIG. 17. The enlarged cross-section regions 129 to 132 are defined by rectangular walls 120 to 128. The cross-section of the enlarged cross-section regions is substantially trapeyoidal.

Next, a fourth embodiment of this invention will be described with reference to FIGS. 19 to 24. The parts which correspond to the parts in the above-described embodiments are denoted by the same reference numerals and will not be described in detail.

The dialysis efficiency depends greatly on the shape of the housing. The relationships between the shape and the above-described dialysance have been studied. It has been found that the dialysance is greatly increased when the relationship:

$$W = kA \ldots \quad (12)$$

Figure 19:
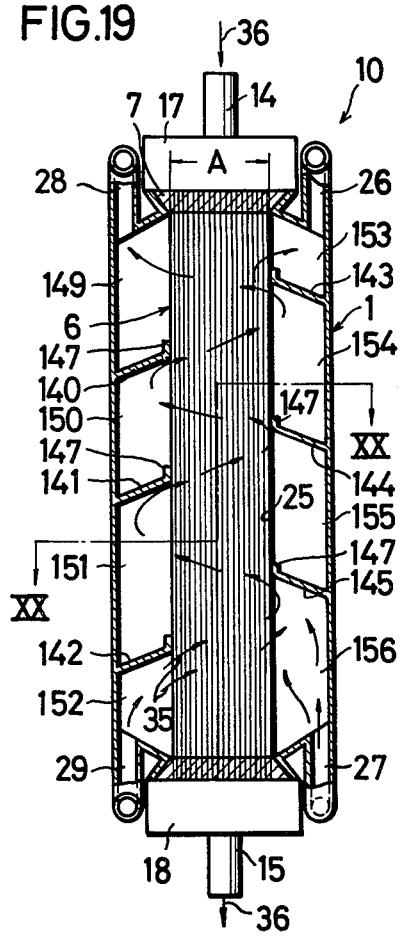
FIG. 19 is a cross-sectional view of a vertical-type blood dialysis apparatus according to a fourth embodiment of this invention.

($k = 1$ to 40 and preferably $K = 1.5$ to 10, and more preferably $k = 2$ to 10) is fulfilled, where W represents the width of the permeating region (see FIG. 20), and A represents the depth of the permeating region (see FIG. 19). This means that it is important that the cross-section of the permeating region is substantially flat. The cross-flow depends greatly on the flatness of the cross-section of the permeating region. It has been proved that the dialysis effect due to the cross-flow can be greatly improved by the fulfilment of the relationship (12). Moreover, it has been proved that the dialysis effect due to the cross-flow can more be improved by the recycle of the dialysate.

Figure 20:
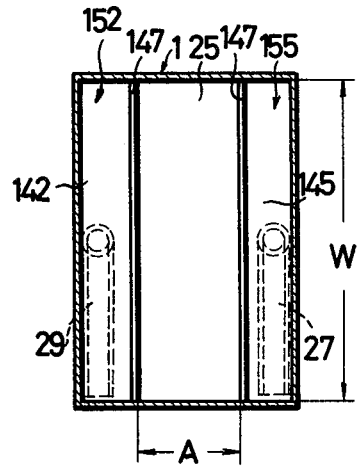
FIG. 20 is a cross-sectional view taken along the line XX—XX of FIG. 19.

Referring to FIGS. 19 and 20, the housing 1 contains the bundle 6 of hollow fibres 5 fixed with the potting material 7. Nearly rectangular oblique guide walls 140, 141, 142, 143, 144 and 145 are formed alternately and integrally with the housing 1, at regular intervals. The inclination angle of the guide walls 140 to 145 can be arbitrarily selected in accordance with the shape of the bundle 6 of hollow fibres 5. However, from the practical viewpoint, it is preferable that the inclination angle is 15° to 75°, and it is more preferable that it is 30° to 60°. The ends of the guide walls 140 to 145 are bent to form support portions 147 which support the bundle 6. The bundle 6 can be favourably supported by the guide walls 140 to 145 without mechanical damage.

Enlarged cross-section regions 149, 150, 151, 152, 153, 154, 155 and 156 are formed by the guide walls 140 to 145, inside the housing 1. The dialysate 35 is led into and out of the enlarged cross-section regions in the above-described manner. As apparent from FIG. 20, the width of the permeating region 25 is W and the depth thereof is A. The width W is equal to the width of the housing 1, and the depth A is equal to the distance between the opposite guide walls, namely the depth of the bundle 6.

Next, examples of experiments will be described.

EXAMPLES OF EXPERIMENTS NO 1 TO NO 16

The experimental conditions are as follows: Housing:

$W \times A = 15$ cm$^2$ (constant), W and A varied.

Hollow fibres:
  7000 hollow fibres of Cuprophane, manufactured by a copper-ammonia method. Effective length, namely the distance between the potting material 7, is 15 cm. Inner diameter of the hollow fibres is 190 μm. Thickness of membrane is 16 μm.

Guide walls:
  Inclination angle is 45°. Height, namely distance between bundle 6 and inner surface of housing 1 is 1.5 cm.

For the measurement of dialysance, instead of blood, an aqueous solution containing NaCl (molecular weight 58.5), urea (molecular weight 60), creatinine (molecular weight 113) and vitamin $B_{12}$ (molecular weight 1355) was used. As the dialysate pure water was used.

When the dialysate was not recycled, the outlet tube 26 and the inlet tube 29 were closed, namely a single pass method was employed. In the single pass method, the mean flow rate Qb of the aqueous solution supplied fom the inlet tube 14 was 200 ml/min. The mean flow rate Qd of the pure water supplied from the inlet tube 28 was 500 ml/min. The temperature of the aqueous solution and the pure water was 37° C. The amount of NaCl was measured by the electric conductivity. The amounts of urea, creatinine and vitamine $B_{12}$ were measured by a spectrometric method.

The results are shown in Table I.

TABLE I

| Ex. No | W/A (k) | Qd (ml/min) | Qrd (ml/min) | dialysance (ml/min) | | |
|---|---|---|---|---|---|---|
| | | | | NaCl | Urea | Creatinine |
| 1 | 0.33 | 500 | 0 | 120 | 131 | 80 |
| 2 | 0.33 | 500 | 1500 | 132 | 135 | 93 |
| 3 | 0.33 | 500 | 3000 | 136 | 136 | 92 |
| 4 | 0.33 | 300 | 5000 | 136 | 137 | 93 |
| 5 | 0.50 | 500 | 0 | 124 | 132 | 90 |
| 6 | 0.50 | 500 | 1500 | 134 | 138 | 94 |
| 7 | 0.50 | 500 | 3000 | 135 | 138.5 | 95 |
| 8 | 0.50 | 300 | 5000 | 138 | 140 | 96 |
| 9 | 0.75 | 500 | 0 | 132 | 135 | 90 |
| 10 | 0.75 | 500 | 1500 | 143 | 142 | 98 |
| 11 | 0.75 | 500 | 3000 | 141 | 142 | 100 |
| 12 | 0.75 | 300 | 5000 | 145 | 143 | 102 |
| 13 | 1.00 | 500 | 0 | 133 | 140 | 98 |
| 14 | 1.00 | 500 | 1500 | 148 | 147 | 106 |
| 15 | 1.00 | 500 | 3000 | 149 | 149 | 107 |
| 16 | 1.00 | 300 | 5000 | 152 | 150 | 108 |

In the above example, $A \times xW = 15$ cm$^2$, Qd represents the flow rate of fresh dialysate (pure water) supplied, and Qrd the flow rate of recycled dialysate (pure water).

Figure 21:
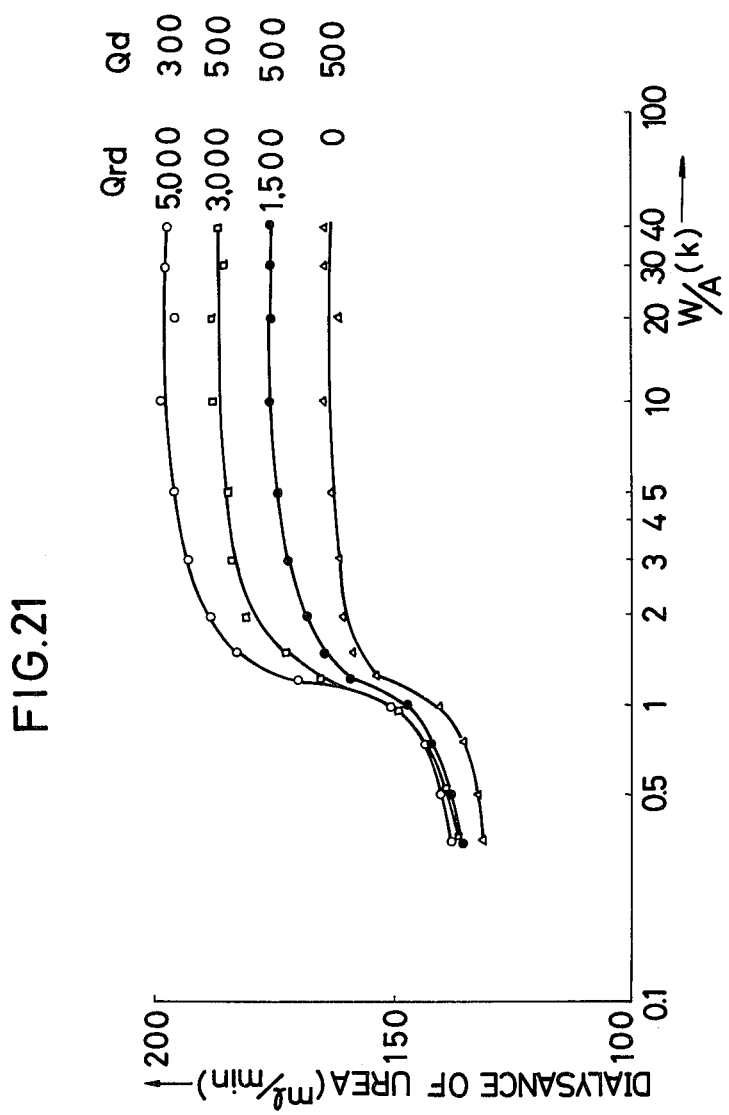
FIG. 21 to FIG. 23 are graphs showing the relationships between the dialysance and the shape of the permeating region.

As apparent from Table I, when $R = W/A < 1$, the dialysance for Qrd $\neq$ 0 (recycling) is much larger than the dialysance for Qrd = 0 (not recycling). Further, the dialysance increases with the value of $k$. FIG. 21 shows a graph of the results of Table 1. As apparent from FIG. 21, the dialysance increases sharply near $k = 1$.

EXAMPLES OF EXPERIMENTS NO 17 TO NO 28

As in the above examples, the dialysis apparatus of FIGS. 19 and 20 was used. $W \times A = 20$ cm$^2$, the number of hollow fibres 5 was 10000, and Qb = 280 ml/min. Other conditions were the same as in the above examples. In these examples, the dialysance of vitamin $B_{12}$ was measured. The results are shown in Table II.

TABLE II

| Example No | W/A (k) | Qd (ml/min) | Qrd (ml/min) | Dialysance of vitamin $B_{12}$ (ml/min) |
|---|---|---|---|---|
| 17 | 0.33 | 500 | 0 | 20 |
| 18 | 0.33 | 500 | 1500 | — |
| 19 | 0.33 | 500 | 3000 | 24 |
| 20 | 0.33 | 300 | 5000 | 24 |
| 21 | 0.50 | 500 | 0 | 22 |
| 22 | 0.50 | 500 | 1500 | 24 |
| 23 | 0.50 | 500 | 3000 | 25 |
| 24 | 0.50 | 300 | 5000 | 26 |
| 25 | 1.00 | 500 | 0 | 22 |

TABLE II-continued

| Example No | W/A (k) | Qd (ml/min) | Qrd (ml/min) | Dialysance of vitamin $B_{12}$ (ml/min) |
|---|---|---|---|---|
| 26 | 1.00 | 500 | 1500 | 28 |
| 27 | 1.00 | 500 | 3000 | 28 |
| 28 | 1.00 | 300 | 5000 | 30 |

Also in these examples, the effect of recycling the dialysate is significant. The dialysance increases with the value of $k$.

Figure 22:
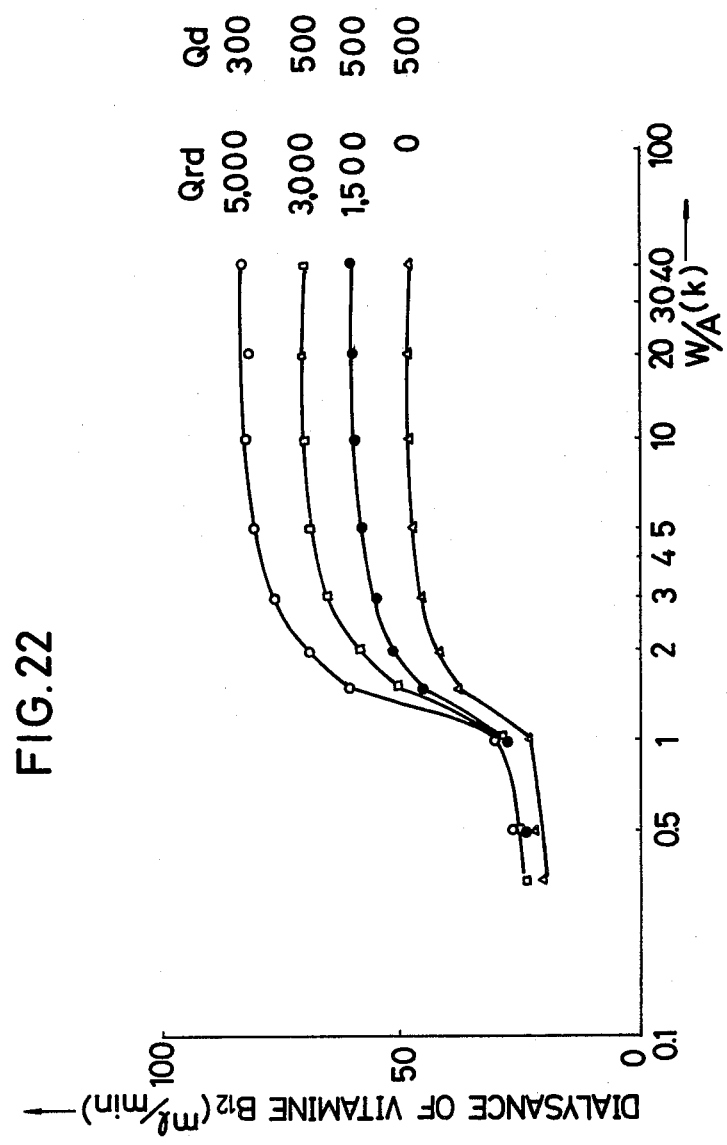
Figure 23:
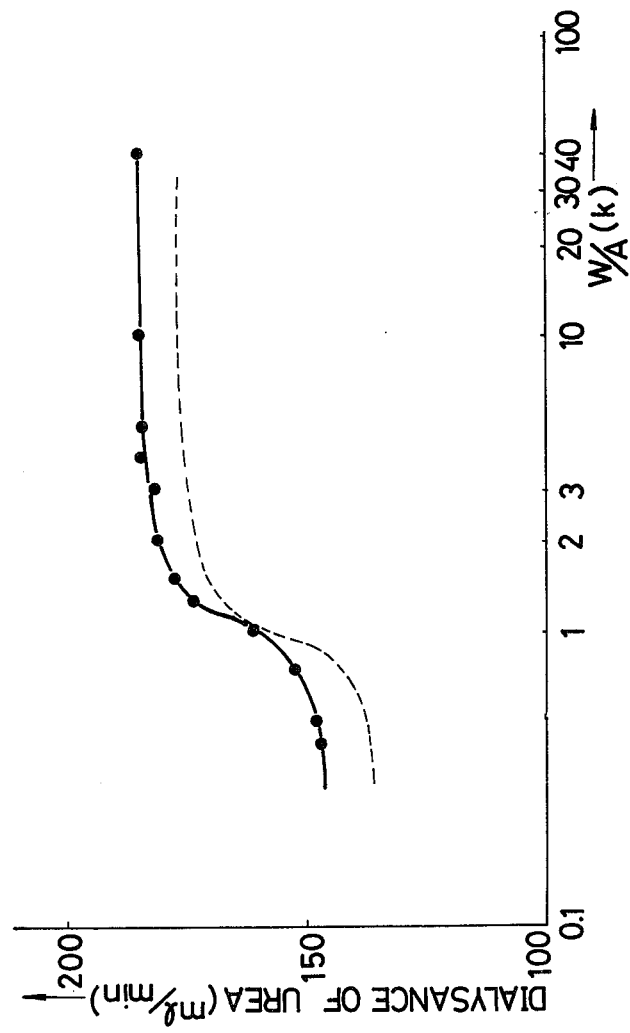

FIG. 22 shows a graph of the results of Table II. As apparent from FIG. 22, the dialysance increases sharply near $k = 1$.

EXAMPLES OF EXPERIMENTS NO 29 TO NO 64

Also in these examples, the dialysis apparatus of FIGS. 19 and 20 was used. All the values of $k$ were over 1. The results are shown in Table III.

TABLE III

| Example No | W/A (k) | Qd (ml/min) | Qrd (ml/min) | Dialysance NaCl | Dialysance Urea | Dialysance Creatinine |
|---|---|---|---|---|---|---|
| 29 | 1.25 | 500 | 0 | 144 | 153 | 119 |
| 30 | 1.25 | 500 | 1500 | 154 | 159 | 122 |
| 31 | 1.25 | 500 | 3000 | 162 | 165 | 124 |
| 32 | 1.25 | 300 | 5000 | 166 | 170 | 135 |
| 33 | 1.50 | 500 | 0 | 149 | 158 | 117 |
| 34 | 1.50 | 500 | 1500 | 161 | 164 | 125 |
| 35 | 1.50 | 500 | 3000 | 170 | 172 | 133 |
| 37 | 2.00 | 500 | 0 | 154 | 160 | 121 |
| 38 | 2.00 | 500 | 1500 | 162 | 167 | 128 |
| 39 | 2.00 | 500 | 3000 | 174 | 179 | 139 |
| 40 | 2.00 | 300 | 5000 | 186 | 188 | 146 |
| 41 | 3.00 | 500 | 0 | 156 | 161 | 120 |
| 42 | 3.00 | 500 | 1500 | 168 | 171 | 131 |
| 43 | 3.00 | 500 | 3000 | 181 | 183 | 140 |
| 44 | 3.00 | 300 | 5000 | 190 | 192 | 149 |
| 45 | 5.00 | 500 | 0 | 160 | 163 | 123 |
| 46 | 5.00 | 500 | 1500 | 170 | 173 | 133 |
| 47 | 5.00 | 500 | 3000 | 181 | 184 | 143 |
| 48 | 5.00 | 300 | 5000 | 192 | 195 | 146 |
| 49 | 10.00 | 500 | 0 | 159 | 164 | 124 |
| 50 | 10.00 | 500 | 1500 | 172 | 176 | 137 |
| 51 | 10.00 | 500 | 3000 | 182 | 187 | 148 |
| 52 | 10.00 | 300 | 5000 | 191 | 198 | 156 |
| 53 | 20.00 | 500 | 0 | 159 | 161 | 121 |
| 54 | 20.00 | 500 | 1500 | 175 | 176 | 137 |
| 55 | 20.00 | 500 | 3000 | 185 | 187 | 149 |
| 56 | 20.00 | 300 | 5000 | 192 | 195 | 158 |
| 57 | 30.00 | 500 | 0 | 159 | 169 | 129 |
| 58 | 30.00 | 500 | 1500 | 173 | 175 | 136 |
| 59 | 30.00 | 500 | 3000 | 182 | 185 | 145 |
| 60 | 30.00 | 300 | 5000 | 195 | 197 | 159 |
| 61 | 40.00 | 500 | 0 | 161 | 164 | 124 |
| 62 | 40.00 | 500 | 1500 | 175 | 196 | 146 |
| 63 | 40.00 | 500 | 3000 | 183 | 186 | 158 |
| 64 | 40.00 | 300 | 5000 | 196 | 187 | 158 |

It is understood from the comparison of Table I with Table III that the dialysance increases significantly near $k = 1$. FIG. 21 shows a graph of the results of Table III. As apparent from FIG. 21, the dialysance of urea increases with the recycle flow rate of the dialysate. However, also in the case when the dialysate is not recycled (Qrd = 0), the dialysance increases significantly near $k = 1$. It is understood from FIG. 21 that $k$ is preferably 1.5 to 20, and more preferably 2 to 10.

EXAMPLES OF EXPERIMENTS NO 65 TO NO 91

Also in these examples, the apparatus of FIGS. 19 and 20 was used. W × A = 20 cm², the number of hollow fibres 5 was 10000, and Qd = 280 ml/min. The other conditions were the same as in the above-described examples. The dialysance of vitamin $B_{12}$ was measured. The results are shown in Table IV and in FIG. 22.

TABLE IV

| Ex. No. | W/A (ml/min) | Qd (ml/min) | Qrd (ml/min) | Dialysance of Vitamin $B_{12}$ |
|---|---|---|---|---|
| 65 | 1.50 | 500 | 0 | 37 |
| 66 | 1.50 | 500 | 1500 | 45 |
| 67 | 1.50 | 500 | 3000 | 50 |
| 68 | 1.50 | 300 | 5000 | 60 |
| 69 | 2.00 | 500 | 0 | 41 |
| 70 | 2.00 | 500 | 1500 | 51 |
| 71 | 2.00 | 500 | 3000 | 58 |
| 72 | 2.00 | 300 | 5000 | 69 |
| 73 | 3.00 | 500 | 0 | 45 |
| 74 | 3.00 | 500 | 1500 | 55 |
| 75 | 3.00 | 500 | 3000 | 64 |
| 76 | 3.00 | 300 | 5000 | 76 |
| 77 | 5.00 | 500 | 0 | 46 |
| 78 | 5.00 | 500 | 1500 | 57 |
| 79 | 5.00 | 500 | 3000 | 69 |
| 80 | 5.00 | 300 | 5000 | 80 |
| 81 | 10.00 | 500 | 0 | 48 |
| 82 | 10.00 | 500 | 1500 | 59 |
| 83 | 10.00 | 500 | 3000 | 69 |
| 84 | 10.00 | 300 | 5000 | 82 |
| 85 | 30.00 | 500 | 0 | 48 |
| 86 | 30.00 | 500 | 1500 | 59 |
| 87 | 30.00 | 500 | 3000 | 70 |
| 88 | 30.00 | 300 | 5000 | 81 |
| 89 | 40.00 | 500 | 0 | 48 |
| 90 | 40.00 | 500 | 1500 | 60 |
| 91 | 40.00 | 300 | 5000 | 83 |

As apparent from FIG. 22 showing the results of Table II and Table IV, the dialysance of vitamin $B_{12}$ is improved with the recycling of the dialysate and it increases sharply near $k = 1$ both in the case of recycling and in the case of a single pass.

EXAMPLES OF EXPERIMENT NO 92

The same apparatus as in the above described examples was used. Qd = 3000 ml/min, Qrd = 2700 ml/min, Qb = 200 ml/min and the temperature was 37° C. The results are shown by the solid line of FIG. 23. As apparent from FIG. 23, the dialysance of urea increases very sharply near $k = 1$.

The apparatus of FIGS. 19 and 20 may be modified as follows.

The number of guide walls 140 to 145 may be varied. The shape thereof may be curved. Moreover, the guide walls may be normal to the lengthwise direction of the bundle 6. As shown in FIG. 19, when the guide walls are inclined upward, the course of the dialysate flow can be changed. The side wall of the housing 1, having the width A, may be of semicircular or semielliptical shape. In such a case, coagulation of the blood flowing through the hollow fibres 5 can be effectively prevented. The guide walls 140 to 145 are alternately arranged in the housing 1, but they may be arranged symmetrically with respect to the bundle 6. It is preferable that the inlet tubes 28 and 29, and the outlet tubes 27 and 26 are diagonally arranged in the housing 1, as shown in FIG. 19, but they may be arranged on the same side of the housing 1, from the viewpoint of facility of handling and manufacture.

Figure 24:
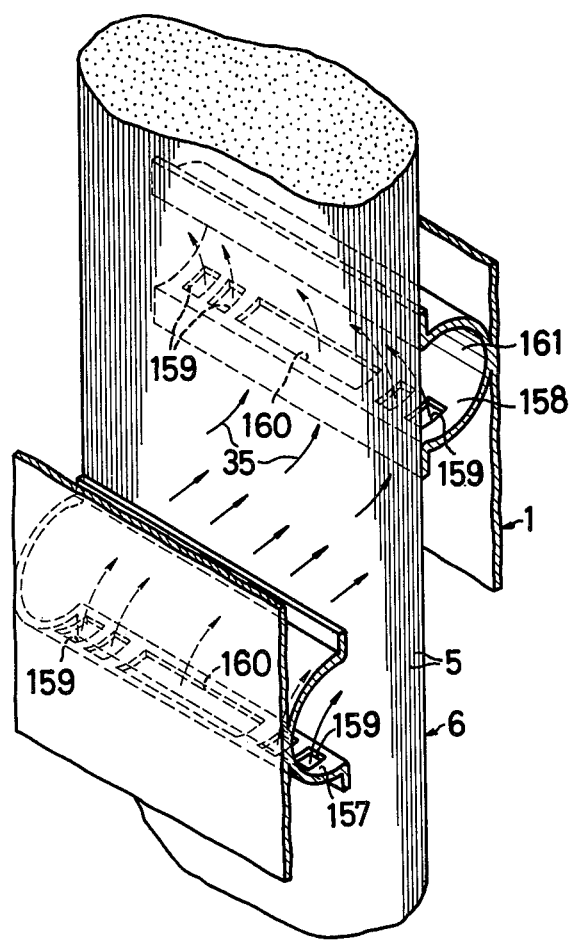
FIG. 24 is a partly broken away perspective view of one modification of the apparatus of FIG. 19.

FIG. 24 shows a modification of the apparatus of FIGS. 19 and 20. In particular, the guide walls are modified. Guide walls 157 and 158 defining enlarged cross-section regions are semi-cylindrical, and diagonally arranged in the housing 1. Openings 159 and 160 for the dialysate 35 are formed in lower parts of the guide walls 157 and 158. The openings 160 are formed in the centre of the lower parts of the guide walls 157 and 158, and are larger than the openings 159 which are formed on both sides of the central openings 160. The dialysate flow can be controlled by the openings 159 and 160. The dialysate 35 from the lower guide wall 157 flows through the bundle 6 into the region 161 defined by upper guide wall 158. A part of the dialysate 35 flows through the openings 159 and 160 into the region 161 of the guide wall 158. The flow is weakened by the smaller openings 159, while the flow is relatively intensified by the larger opening 160. As a result, the flow rate of the dialysate 35 flowing between the inner surface of the housing 1 and the bundle 6 is relatively low, while the flow rate of the dialysate 35 flowing through the central portion of the bundle 6 is relatively high.

Next, a fifth embodiment of this invention will be described with reference to FIGS. 25 to 36.

In this embodiment, the dialysate is not recycled, and various modifications of the enlarged cross-section portions are shown.

Referring to FIGS. 25 and 26, in a blood dialysis apparatus 10, the upper and lower end portions of a housing 1 are cylindrically shaped as in the conventional apparatus of FIG. 1, while the main portion of the housing 1 is square in cross-section. The main portion of the housing 1 may be differently formed, as described below. Semi-cylindrical enlarged cross-section portions 170, 171 and 172 are formed at regular intervals in one side 50 of the housing 1. Semicylindrical enlarged cross-section portions 173, 174 and 175 are formed at regular intervals in another side 51 of the housing 1. The enlarged crosssection portions 170, 171 and 172, and the enlarged cross-section portions 173, 174 and 175 are alternately arranged, and extend over the width of the sides 50 and 51, respectively. As shown in FIG. 26, similar semicylindrical regions defined by the enlarged cross-section portions 170 to 175 communicate with the permeating region 5 charged with the bundle 6. The cross-section of the permeating region 25 is square. An outlet tube 3 for dialysate 35 is connected to the enlarged cross-section portion 170, and an inlet tube 2 for dialysate 35 is connected to the enlarged cross-section portion 175.

As in the apparatus of FIG. 1, the upper and lower disc covers 13, and the upper and lower fastening rings 17 and 18 are arranged on the upper and lower end portions of the housing 1. Potting material 7 is disposed at the upper and lower ends of the bundle 6. Since the cross-section of the upper and lower end portions of the housing 1 is circular, the upper and lower ends of the bundle 6 are formed into circular form with the potting material 7. However, the main portion of the bundle 6 follows the contour of the permeating region 25 which is square in cross-section, since the bundle 6 is very flexible.

In the apparatus of FIGS. 25 and 26, enlarged cross-section regions 176, 177, 178, 179, 180 and 181 defined by the enlarged cross-section portions 170 to 175 are not charged with the hollow fibres 5.

The dialysate 35 is led into the enlarged cross-section region 181 through the inlet tube 2 having the opening 22. Thus the incoming dialysate flow through the inlet tube 2 does not locally concentrate on the bundle 6 and there is very little possibility that the bundle 6 is damaged by the rush of the dialysate flow.

The upper and lower end portions of the housing 1, which are circular in cross-section in FIG. 25, may be square in cross-section. In such a case, the covers 13 and the fastening rings 17 and 18 are square in cross-section. The blood compartment 13A of the covers 13 are similarly square in cross-section. The fastening rings 17 and 18 are secured to the housing 1 in such a manner that ridges formed on the inner surface of the fastening rings 17 and 18 fit into grooves formed on the outer surface of the housing 1.

FIG. 27 shows a modification of the apparatus of FIGS. 25 and 26. In this modification, the enlarged cross-section portion 170, 171 and 172 formed on the side 50 of the housing 1 are shifted downward with respect to the apparatus of FIGS. 25 and 26, while the enlarged cross-section portions 173, 174 and 175 formed on the other side 51 of the housing 1 are shifted upward with respect to the apparatus of FIGS. 25 and 26. The enlarged cross-section portions 170, 171 and 172, and the enlarged cross-section portions 173, 174 and 175 are alternately arranged in the housing 1. The inlet tube 2 for dialysate 35 is directly connected to the side 51 of the housing 1, not to the enlarged cross-section portion 175, and the outlet tube 3 for dialysate 35 is directly connected to the side 50 of the housing 1, not to the enlarged cross-section portion 170.

Accordingly, the apparatus 10 of FIG. 27 is different from the apparatus of FIGS. 25 and 26 in terms of the fact that the dialysate 35 is not so uniformly distributed near the inlet opening 22 over the width of the side 51 of the housing 1 and that the dialysate 35 is not so uniformly collected near the oulet opening 23 from over the width of the side 50 of the housing 1. However, also in this apparatus 10, the dialysate 35 repeatedly crosses back and forth through the bundle 6 as shown by the arrows in FIG. 27. Accordingly, satisfactory cross-flow can be obtained.

FIG. 28 shows another modification of the apparatus of FIGS. 25 and 26. In this modification, the enlarged cross-section portions 170, 171 and 172 formed on the side 50 of the housing 1 are slightly shifted upward with respect to the apparatus of FIG. 27, while the enlarged cross-section portions 173, 174 and 175 formed on the other side 51 of the housing 1 are shifted downward with respect to the apparatus of FIG. 17. Accordingly, the enlarged cross-section portions 170, 171 and 172, and the enlarged cross-section portions 173, 174 and 175 are symmetrically arranged with respect to the bundle 6. Although the apparatus of FIG. 28 is only slightly different from the apparatus of FIG. 27 in the flow of the dialysate 35, as shown by the arrows in FIG. 28, the apparatus of FIG. 28 is, as shown, rather different in operation.

Figure 29A:
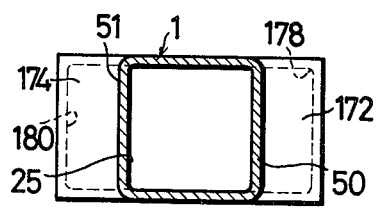
FIGS. 29A to 29H are cross-sectional views of modifications of the housing.
Figure 29E:
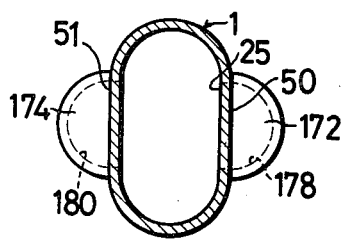
Figure 29B:
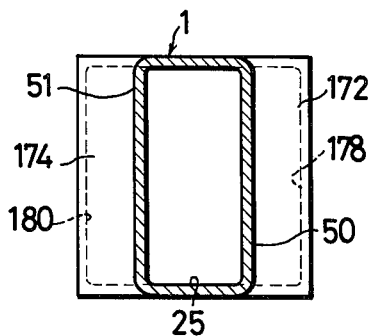
Figure 29F:
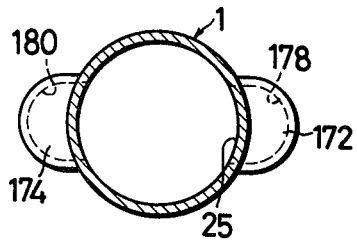
Figure 29C:
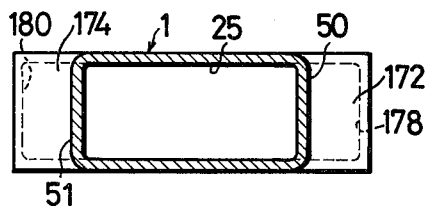
Figure 29G:
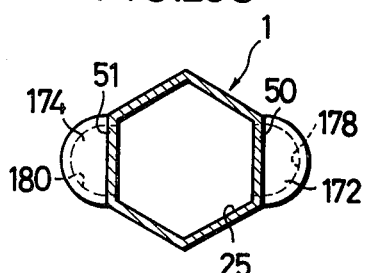
Figure 29D:
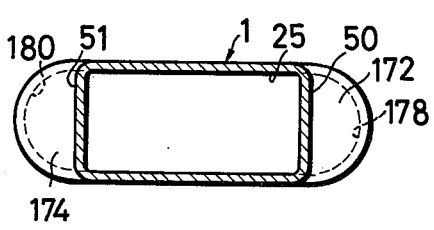

FIGS. 29B to 29H show various modifications of the housing 1 in the apparatus of FIG. 25. FIG. 29A is a cross-section of the housing 1 taken along the line XXIXA—XXIXA of FIG. 26. FIGS. 29B to 29H are cross-sections of the various modifications of the housing 1, taken similarly to FIG. 29A. The housings 1 of FIGS. 29A to 29D are rectangular in cross-section. The enlarged cross-section portions 172 and 174 in the housings 1 of FIGS. 29B and 29C are semicylindrical, as are the enlarged cross-section portions in the housing 1 of FIG. 29A. The enlarged cross-section portions 172 and 174 in the housing 1 of FIGS. 29D are hemispherical.

In FIG. 29B, the length of the enlarged cross-section regions 178 and 180, connecting with the permeating region 25 is relatively large in comparison with the cross-sectional area of the permeating region 25. In other words, the cross-section of the permeating region 25 is flat. Accordingly, the dialysate 35 is widely dispersed in the enlarged cross-section region 181 adjacent to the inlet opening 22, and then flows upward across the bundle 6. This distribution or dispersion of the dialysate 35 is very favourable and effective. The greater the ratio of the length of the cross-section of the permeating region 25 to the width thereof, the more effective the distribution obtained. However, too large a ratio is unfavourable from the viewpoint of handling. In practice, it is preferable that the ratio is 1.5 to 20, and more preferable that it is 2 to 10.

Figure 29H:
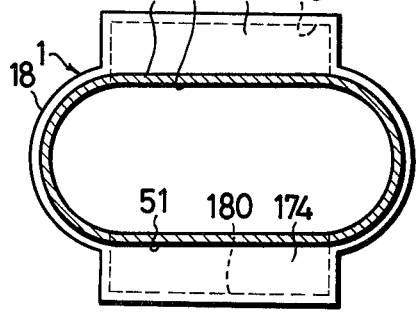

The cross-sections of the housings 1 of FIGS. 29E to 29H are oblong. The cross-section of the housing 1 of FIG. 29F is circular. The cross-section of the housing 1 of FIG. 29G is hexagonal. The enlarged cross-section portions 172 and 174 in the housings 1 of FIGS. 29E to 29G are hemispherical. The enlarged cross-section portions 172 and 174 in the housing 1 of FIG. 29H is triangular in longitudinal cross-section.

The upper and lower end portions of the housings 1 of FIGS. 29A to 29H may be circular or rectangular. The enlarged cross-section portion or the non-permeating regions may be differently shaped, as described below.

Figure 30:
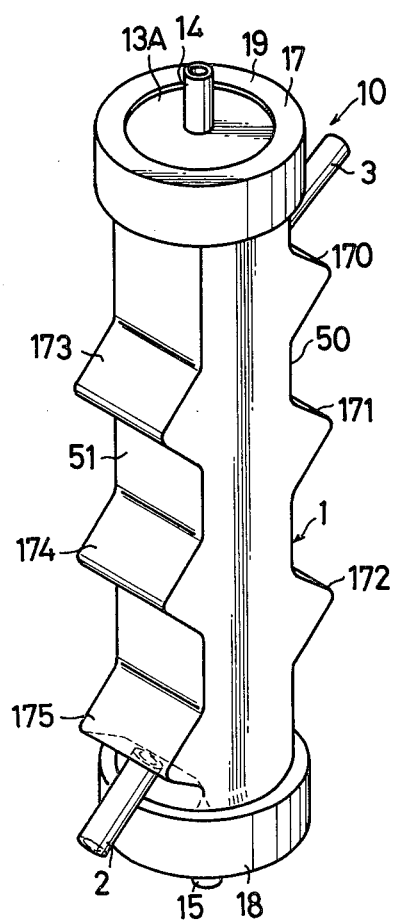
FIGS. 30 to 33 are perspective views of further modifications of the apparatus of FIG. 25.
Figure 31:
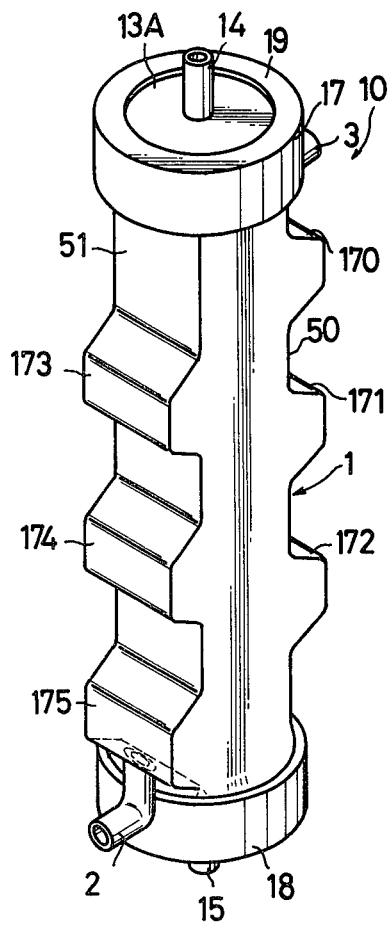
Figure 32:
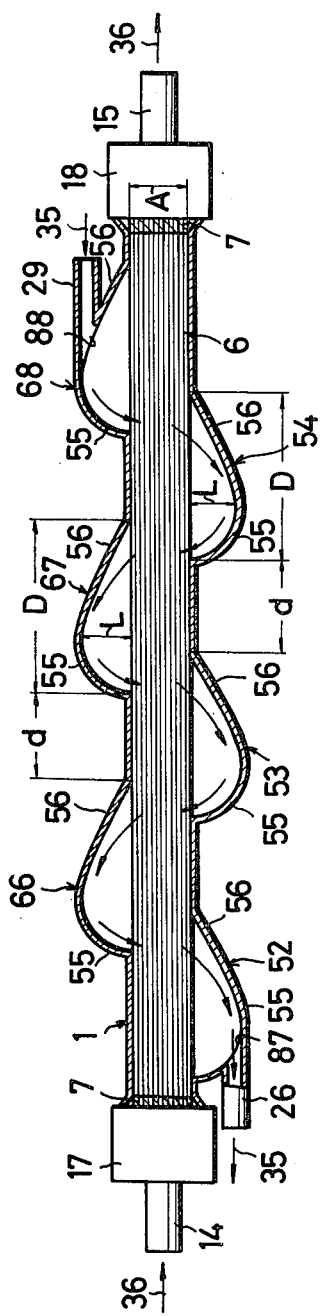

FIGS. 30, 31 and 32 show further modifications of the apparatus of FIG. 25.

In FIG. 30, the enlarged cross-section portions 170 to 175 are of triangular, and in FIG. 31, the enlarged cross-section portions 170 to 175 are trapezoidal.

In FIG. 32, the shape of the enlarged cross-section portions 52, 53, 54, 66, 67 and 68 is the same as in FIG. 3. However, the dialysate 35 is not recycled. Accordingly, the inlet tube 27 and the outlet tube 28 shown on FIG. 3 are not provided in the apparatus of FIG. 32. The inlet tube 29 for recycling dialysate 35 and the outlet tube 26 for recycling dialysate 35 in FIG. 3 are used respectively as the inlet tube for supplying the dialysate 35 and the outlet tube for discharging the dialysate 35 in the apparatus of FIG. 32. The enlarged cross-section portions are designed to fulfil the above relationships (1), (2), (3), (4), (5) and (12). As in the first embodiment, effective cross-flow can be generated. In this embodiment, the dialysate 35 can recycle using the inlet and outlet tubes 29 and 26, and supply and withdrawal of the dialysate 35 can be made in the recycling circuit. For example, the supply and withdrawal of the dialysate 35 can be made in the small tank in the circuit, or using the way shown in FIG. 10.

Figures 33, 34, 35:
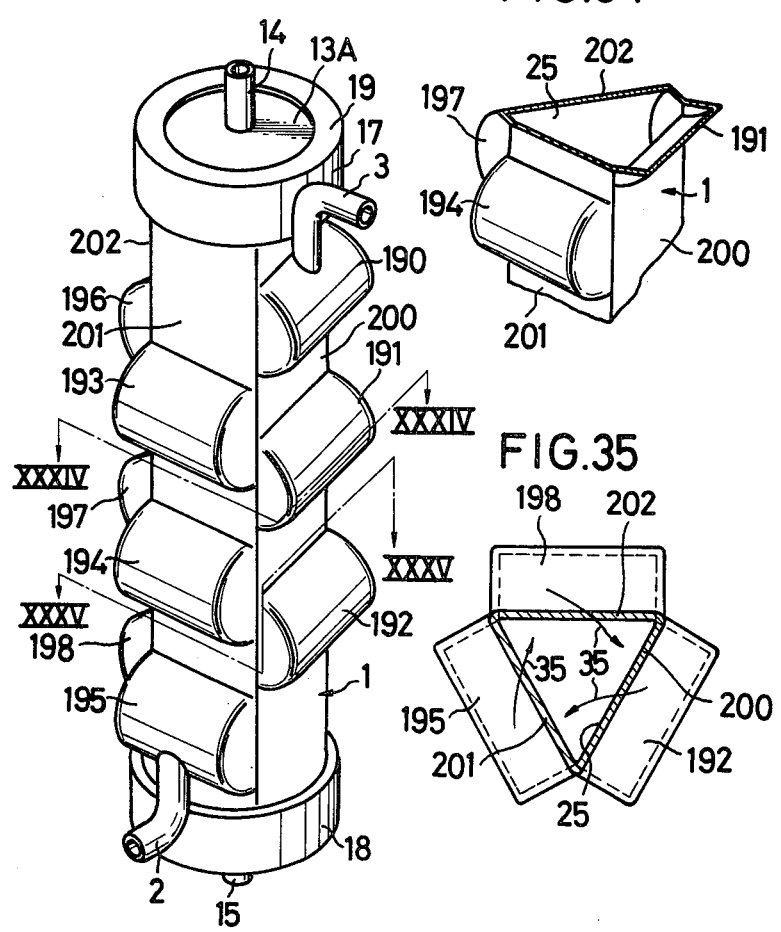
FIG. 34 is a cross-sectional perspective view taken along the line XXXIV—XXXIV of FIG. 33.
FIG. 35 is a cross-sectional view taken along the line XXXV—XXXV of FIG. 33.

FIGS. 33, 34 and 35 show a further modification of the apparatus of FIG. 25.

As shown in FIGS. 33, 34 and 35, the main portion of the permeating region 25 is triangular in cross-section. Enlarged cross-section portions 190, 191 and 192 are formed at regular intervals in a first side 200 of the housing 1. Enlarged cross-section portions 193, 194 and 195 are formed at regular intervals in a second side 201 of the housing 1. Enlarged cross-section portions 196, 197 and 198 are formed at regular intervals in a third side 202 of the housing 1. The enlarged cross-section portions 190, 196, 193, 191, 197, 194, 192, 198 and 195 descend along the housing 1 in that order. In other words, the enlarged cross-section portions are arranged spirally.

The dialysate 35 from the inlet tube 2 leading into the enlarged cross-section portion 195 passes upward across the bundle 6 in the clockwise direction shown by the arrows in FIG. 35. The dialysate 35 flows upward spirally in the housing 1, deflecting into the enlarged cross-section portions 195, 198, 192, 194, 197, 191, 193, 196 and 190 in that order, so that the dialysate 35 repeatedly crosses through the bundle 6.

FIG. 36 shows a further modification of the apparatus of FIG. 25. In this modification, the permeating region 25 is cylindrical. The hemispherical enlarged cross-section portions 190 to 198 are formed in the circumferential side of housing 1 in the same manner as in FIGS. 33 to 35.

In the apparatus of FIGS. 33 to 35 the enlarged cross-section portions 190 to 198 are semi-cylindrical, but may be triangular in longitudinal cross-section. The dialysate 35 may be recycled in such a manner that the inlet tube for supplying dialysate 35 is connected to the enlarged cross-section portion 192, the outlet tube for discharging dialysate 35 is connected to the enlarged cross-section portion 193, and the inlet tube 2 and the outlet tube 3 are used for recycling dialysate 35. Also in such a case, the dialysate 35 can flow upward spirally in the housing 1, repeatedly crossing spirally through the bundle 6. The recycling effect can be obtained in the same manner as in the first embodiment.

Next, a sixth embodiment of this invention will be described with reference to FIGS. 37 to 51. The parts which correspond to parts in the apparatus of FIG. 1 are denoted by the same reference numerals.

In the apparatus of FIGS. 37 to 39, the cross-section of the housing 1 is flat and generally oblong, with the short sides of the housing round. The cross-section of the housing 1 may be rectangular with four rounded corners. When the housing 1 does not need to be flat, the cross-section may be square with four rounded corners.

The housing 1 is, as a whole, formed with point symmetry. Enlarged cross-section portions 210 and 211 which are trapezoid in cross-section, are formed in the sides 50 and 51 of the housing 1, respectively, extending over the width of the housing 1. The enlarged cross-section portion 210 is formed near the upper end of the side 50 of the housing 1 and the enlarged cross-section portion 211 is formed near the lower end of the side 51 of the housing 1, so that the enlarged cross-section portions 210 and 211 lie on the diagonal line with respect to the housing 1. The inlet tube 2 for dialysate 35 is horizontally connected to one end of the enlarged cross-section portion 211. The outlet tube 3 for dialysate 35 is horizontally connected to one end of the enlarged cross-section portion 210. The inlet tube 2 and the outlet tube 3 are oppositely directed. Such arrangement is advantageous in uniform distribution of the dialysate 35 to the bundle 6. However, the enlarged cross-section portions may be formed in the same side of the housing 1 for easy handling and manufacture. The enlarged cross-section regions 212 and 213 defined by the enlarged cross-section portions 210 and 211 communicate with the flat permeating region 25 containing the bundle 6 of hollow fibres 5.

The dialysate 35 is led into the housing 1 through the inlet opening 22. The dialysate 35 first comes into the enlarged cross-section region 213, which has much lower resistance than the permeating region 25, and is uniformly distributed in the enlarged cross-section region 213, which extends over the width of the side 51 of the housing 1. Then, the dialysate 36 flows upward through the bundle 6. Accordingly, there is verz little possibility that a part of the bundle 6 adjacent to the inlet opening 22 is damaged with the rush of incoming dialysate 35. The dialysate or urea by this apparatus is shown by the dotted line on FIG. 23. As apparent from FIG. 23, the dialysance increases sharply near $k = 1$.

FIG. 40 shows a modification of the apparatus of FIGS. 37 to 39. In this modification, the enlarged cross-section portions 210 and 211 are semi-cylindrical. The outlet tube 3 and the inlet tube 2 are respectively connected to central parts of the enlarged cross-section portions 212 and 213 in FIG. 40. The tubes 2 and 3 L-shaped. Except for the above-described points, this apparatus is substantially the same as the apparatus of FIGS. 37 to 39, and accordingly operates substantially the same way.

FIG. 41 shows a further modification of the apparatus of FIGS. 37 to 39. This modification is substantially the same as the apparatus of FIG. 40, except that the enlarged cross-section portion 210 and 211 are nearly rectangular in cross-section. Accordingly, this modification has substantially the same effect as the apparatus of FIG. 40.

FIG. 42 shows a further modification of the apparatus of FIGS. 37 to 39. In this modification, the upper half of the enlarged cross-section portions 210 and 211 is rectangular in cross-section as in FIG. 41, and the lower half of the enlarged cross-section portions 210 and 211 is semicircular in cross-section as in FIG. 40. The arrangement and shape of the inlet tube 2 and the outlet tube 3 are substantially the same as in FIGS. 37 to 39. The other arrangements are substantially the same. Accordingly, this apparatus has substantially the same effect as the apparatus of FIGS. 37 to 39.

FIGS. 43 to 46 show a further modification of the apparatus of FIGS. 37 to 39. In this modification, the outlet tube 3 and the inlet tube 2 are located in the short sides 214 and 215 of the housing 1, lateral to the permeating region 25. The enlarged cross-section regions 212 and 213 extend over the sides 50 and 51 and the short sides 214 and 215 to form L-shapes. In order to effect the distribution of the dialysate 35 from the inlet tube 2 the whole enlarged cross-section region 213, a weir member 216 is attached to the inner surface of the short side 215 in the enlarged cross-section region 213. To effect the uniform discharge of the dialysate 35 from the outlet opening 23, another weir member 217 is attached in the inner surface of the short side 214 in the enlarged cross-section region 212. The weir members 216 and 217 may have the same shape.

The blood inlet tube 14 and the blood outlet tube 15 are formed on the upper cover 13 and the lower cover 13 so as to extend nearly in the same directions as the outlet tube 3 and as the inlet tube 2 for dialysate 35, respectively. The shapes of the blood inlet opening 24 of the blood inlet tube 14, and of the blood outlet opening 24 of the blood outlet tube 15 are similar to the shapes of the compartments 20. Accordingly, the blood 36 can flow smoothly through the inlet opening 24 and the outlet opening 24.

The outlet tube 3 for dialysate 35 and the inlet tube 14 for blood are adjacent to each other, and extend nearly in the same direction. Similarly, the inlet tube 2 for dialysate 35 and the outlet tube 15 for blood are adjacent to each other, and extend nearly in the same direction. Accordingly, caps 218 as shown in FIG. 43 can be simultaneously and simply attached to the blood inlet tube 14 and the dialysate outlet tube 3, or to the blood outlet tube 15 and the dialysate liquid inlet tube 2, by an automatic capping machine (not shown).

Since the weir members 216 and 217 are arranged in the L-shaped enlarged cross-section regions 212 and 213, respectively, the dialysate 35 from the inlet opening 22 is uniformly distributed all over the enlarged cross-section region 213, and it is uniformly collected from the whole enlarged cross-section region 212 towards the outlet opening 23. The flow of the dialysate 35 from the inlet opening 22 does not concentrate to a point of the bundle 6. Accordingly, there is no possibility that the bundle 6 near the inlet opening 22 is damaged by the concentrated flow of the dialysate 35.

FIGS. 47 to 49 show a further modification of the apparatus of FIGS. 37 to 39. In this modification, the apparatus is laterally arranged. In other respects, the apparatus of FIGS. 47 to 49 is substantially the same as the apparatus of FIGS. 43 to 46. As shown in FIGS. 47 and 49, the dialysate 35 flows obliquely through the permeating region 25 from the lower part of the side 51 to the upper part of the side 50. Since the bundle 6 is relatively short, the dialysate 35 can effectively cross the bundle 6. Accordingly, good dialysis efficiency can be obtained.

In the apparatus of FIGS. 47 to 49, the enlarged cross-section regions 212 and 213 extend over the length of the permeating region 25. However, the enlarged cross-section regions 212 and 213 may be formed along a part of the length of the permeating region 25, and thereby the flow of the dialysate 35 in the permeating region 25 can be varied.

FIGS. 50 and 51 show a further modification of the apparatus of FIGS. 37 to 39. In this modification, semicircular enlarged cross-section portions 210 and 211 are respectively formed in the upper and lower end of the housing 1 having a circular cross-section. The inlet tube 2 and the outlet tube 3 are connected to the enlarged cross-section portions 211 and 210, which are disposed opposite to each other. The opening 22 of the inlet tube 2 communicates with the semicircular enlarged cross-section region 213 defined by the enlarged cross-section portion 211, and the opening 23 of the outlet tube 3 communicates with the semicircular enlarged cross-section region 212 defined by the enlarged cross-section portion 210. The cross-section of the enlarged cross-section portions 210 and 211 is trapezoid, as in the apparatus of FIGS. 37 to 39. It may alternatively be rectangular or semicircular. The enlarged cross-section portions 210 and 211 extend over a 180° portion of the circular housing 1, and are displaced from each other by 180°. The dialysate 35 flows upward obliquely through the permeating region 25 from the lower enlarged cross-section region 213 to the upper enlarged cross-section region 212. Thus, the cross-flow can be obtained. The enlarged cross-section portions 210 and 211 may be designed to extend over a 60° to 120° portion of the circular housing 1.

Figure 52:
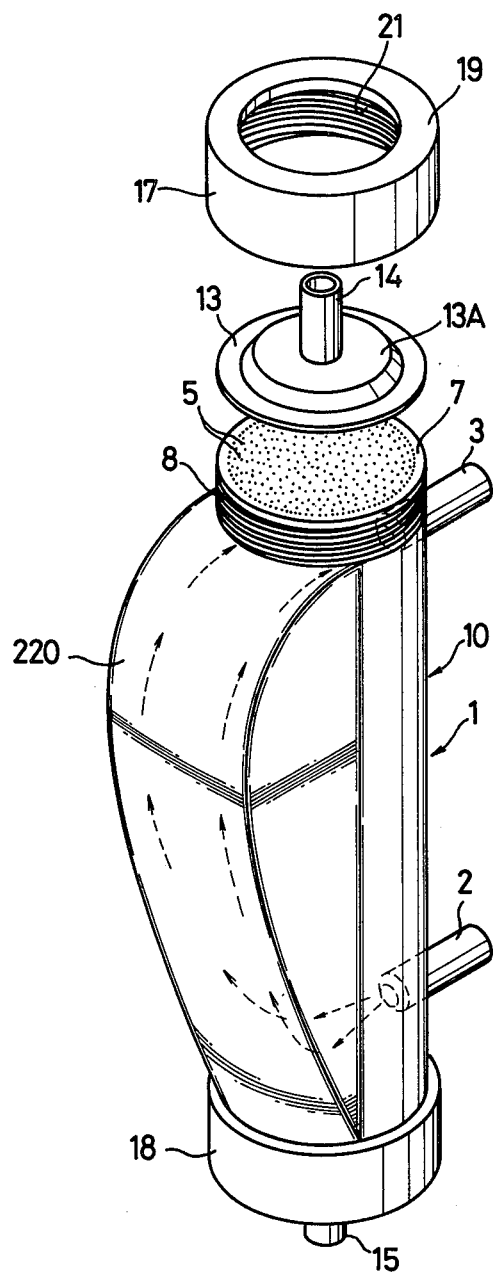
FIG. 52 is a perspective view of a further modification of the apparatus of FIG. 37.

Further, FIG. 52 shows a modification of the apparatus of FIG. 37. In this modification, one curved enlarged cross-section portion 220 is formed in one side of the housing 1, extending over the length of the bundle 6. The inlet tube 2 and the outlet tube 3 are connected to the other side of the housing 1. Due to the curvature of the enlarged cross-section portion 220, dialysate 35 from the inlet tube 2 can cross the bundle 6 and be led to the outlet tube 3.

While there have been described preferred embodiments of the invention, obviously further modifications nad variations are possible in light of the above teachings. It is therefore to be understood that within the scope of the appended claims, the invention may be practised otherwise than as specifically described.

In the above-described embodiments, the blood and the dialysate pass through the permeating region counter-currently with respect to each other. By the combination of the counter-current with the cross-flow generated by the described arrangements, better dialysis can be obtained. However, the blood and the dialysate may pass through the permeating region with the same General flow direction.

As occasion demands, a small tank for dialysate may be combined with the recycle path of the dialysate. In such a case, an inlet opening and outlet opening for replenishing the dialysate are formed in the small tank to which the recycle tube is connected.

Plural inlet openings and outlet openings may be formed in the housing. Moreover, the openings may be differently positioned in the housing. The inlet opening and outlet opening in the above-described embodiments may be reversely used as an outlet opening and inlet opening, respectively.

The embodiments have been described as used for dialysis between two liquids. However, embodiments of the invention may be applied to the movement of material between liquid and gas, or between gas and gas through the hollow fibre membranes. Moreover, such embodiments may be used not only as a blood dialysis apparatus in an artificial kidney, but also for blood oxygen addition apparatus in an artificial lung, in which the blood flows along the inside of the hollow fibres, while the gas or the liquid containing oxygen flows along the outside of the hollow fibres. Also embodiments may be used for de-salting and purification of water by reverseosmosis, manufacturing processes for foods such as condensation of juice, removal of yeast in beer, and so on.

What is claimed is:

1. A hollow-fibre permeability apparatus, comprising:
a housing defining an interior including a permeating region;
a bundle of permeable-wall hollow fibres disposed at least in said permeating region of said housing;
a first inlet and means for causing a first fluid to flow into said first inlet and through said housing adjacent the exterior wall surfaces of said fibres;
a first outlet for passage of said first fluid out of said housing;
a second inlet and means for causing a second fluid to flow into said second inlet and through said housing inside said fibres such that materials selectively permeate through the walls of said fibres; and
at least one portion of said housing in said permeating region being of enlarged cross-section relative to said bundle to define a space between said bundle and a wall of said housing into which at least part of said first fluid passes during its passage from said first inlet to said first outlet, the width of said enlarged cross-section portion being substantially co-extensive with the width of said housing whereby the bundle is exposed across its width to fluid in said enlarged cross-section portion, and across a section of its length determined by the length of said enlarged cross-section portion, the shape of said enlarged cross-section portion promoting cross-flow of said first fluid relative to the length of said fibres, said shape of said enlarged cross-section portion being formed in accordance with the following formula:

$$\tfrac{1}{4} A \leq L \leq 4A, \text{ and}$$

$$A \leq D \leq 12A$$

where A represents one cross-sectional dimension of said bundle, L the length of said enlarged cross-section portion in the direction perpendicular to the lengthwise direction of said bundle, and D the length of said enlarged cross-section portion in the lengthwise direction of said bundle, said length L and length D varying gradually in a direction parallel to the lengthwise direction of said bundle whereby the cross-section in said parallel direction of said enlarged cross-section portion is defined by tapered side walls.

2. A hollow-fibre permeability apparatus according to claim 1, in which a plurality of said enlarged cross-section portions are provided, said enlarged cross-section portions being located in two opposite sides of said housing.

3. A hollow-fibre permeability apparatus according to claim 2, in which said enlarged cross-section portions are alternately disposed in said two opposite sides of said housing between said inlet and outlet tubes.

4. A hollow-fibre permeability apparatus according to claim 1, in which said enlarged cross-section portion is defined by an outwardly extending portion of a wall of said housing.

5. A hollow-fibre permeability apparatus according to claim 1, in which the shape of said enlarged cross-section portion is formed in accordance with the following formula:

$$\tfrac{1}{4} A \leq L \leq 2A, \text{ and}$$

$$A \leq D \leq 8A.$$

6. A hollow-fibre permeability apparatus according to claim 1, in which the length $d$ of a flat support portion of said housing contacting said bundle to support the latter fulfils the following relationship:

$$0 \leq d \leq D.$$

7. A hollow-fibre permeability apparatus according to claim 1, comprising a plurality of said enlarged cross-section portions and in which a lead-in region inclined to the length of said bundle is formed between adjacent said enlarged cross-section portions.

8. A hollow-fibre permeability apparatus according to claim 7, in which said inclined lead-in region is defined by a flat wall contiguous to one of said enlarged cross-section portions and inclined to the length of said bundle.

9. A hollow-fibre permeability apparatus according to claim 8, in which said adjacent enlarged cross-section portions are connected with each other by said inclined flat wall and a flat support portion contacting with said bundle to support the latter.

10. A hollow-fibre permeability apparatus according to claim 9, in which the inclination angle of said lead-in region, the length $m$ of said lead-in region in the lengthwise direction of said bundle, and the length $n$ of said flat support portion of the lengthwise direction of said bundle fulfil the following relationships:

$$\tfrac{1}{3} A \leq m \leq 6A,$$

$$\tfrac{1}{3} \leq n \leq 6A,$$

$$0.1 \leq n/m \leq 10, \text{ and}$$
$$2° \leq \beta \leq 20°.$$

11. A hollow-fibre permeability apparatus according to claim 1, in which a plurality of said enlarged cross-section portions are formed in opposite sides of said housing in sinusoidal configuration relative to said permeating region.

12. A hollow-fibre permeability apparatus according to claim 1, in which said enlarged cross-section portion is shaped at the downstream side relative to the general flow direction of said first fluid, so as to fulfil the following relationship:

$$30° \leq \alpha \leq 90°,$$

where $\alpha$ is defined as follows: on the plane defined by the lengthwise direction of said bundle and the dimension of said enlarged cross-section portion normal to said lengthwise direction, a first straight line and a second straight line are drawn in the downstream direction at angles of 10° and 20° respectively to the lengthwise direction of said bundle from the middle point between the upstream end of said enlarged cross-section portion and the downstream end of said enlarged cross-section portion; a line tangential to the wall of said enlarged cross-section portion is drawn from an arbitrary point on said wall between said first and second lines; and $\alpha$ is the angle of said tangent line to the lengthwise direction of said bundle.

13. A hollow-fibre permeability apparatus according to claim 12, in which angle $\alpha$ satisfies the following relationship:

$$45° \leq \alpha \leq 90°.$$

14. A hollow-fibre permeability apparatus according to claim 12, in which said enlarged cross-section portion is shaped at the upstream side, relative to the general flow direction of said first fluid, so as to fulfil the following relationship:

$$5° \leq \theta \leq 80°$$

where $\theta$ is defined as follows: on the plane defined by the lengthwise direction of said bundle and the dimension of said enlarged cross-section portion normal to said lengthwise direction, a third straight line and a fourth straight line are drawn in the upstream direction at angles of 10° and 20° respectively to the lengthwise direction of said bundle from the middle point between the upstream end of said enlarged cross-section portion and the downstream end of said enlarged cross-section portion; another line tangential to the wall of said enlarged cross-section portion is drawn from an arbitrary point on said wall between said third and fourth lines; and $\theta$ is the angle of said other tangent line to the lengthwise direction of said bundle.

15. A hollow-fibre permeability apparatus according to claim 14, in which said angle $\theta$ satisfies the following relationship:

$$5° \leq \theta \leq 60°$$

16. A hollow-fibre permeability apparatus according to claim 14, in which said angle $\theta$ satisfies the following relationship:

$$10° \leq \theta \leq 45°$$

17. A hollow-fibre permeability apparatus according to claim 1, in which said permeating region is shaped to fulfil the following relationship:

$$W = kA$$

where W and A respectively represents the cross-sectional dimensions of said permeating region, and $k > 1$.

18. A hollow-fibre permeability apparatus according to claim 17, in which $k$ satisfies the following relationship:

$$1 < k < 40.$$

19. A hollow-fibre permeability apparatus according to claim 17, in which $k$ satisfies the following relationship:

$$1.5 < K < 20.$$

20. A hollow-fibre permeability apparatus according to claim 17, in which $k$ satisfies the following relationship:

$$2 < k < 10.$$

21. A hollow-fibre permeability apparatus according to claim 1, in which said inlet and outlet tubes are connected to a recycling circuit for recycling said first fluid through said housing, and another inlet tube and another outlet tube are provided for supplying fresh said first fluid and for withdrawing a part of said first fluid.

22. A hollow-fibre permeability apparatus according to claim 21, in which a tank is connected in said recycling circuit such that said first fluid passing out of said outlet tube for recycling enters said tank and then passes from said tank into said inlet tube, and said other inlet and outlet tubes are connected to said tank.

23. A hollow-fibre permeability apparatus according to claim 21, in which said inlet and outlet tubes for recycling said first fluid are diagonally arranged in opposite sides of said housing, and said other inlet and outlet tubes for supplying and discharging said first fluid are arranged in the sides of said housing opposite to said inlet and outlet tubes for recycling said first fluid, respectively.

24. A hollow-fibre permeability apparatus according to claim 21, in which said outlet tube for recycling said first fluid is bifurcated, two ends of said bifurcated outlet tube are connected to respective ends of one side of said housing, and said inlet tube for recycling said first fluid is connected to the central portion of the other side of said housing.

25. A hollow-fibre permeability apparatus according to claim 24, in which the cross-section of said permeating region is flat, and said enlarged cross-section portion is formed on the longer side of the cross-section of said permeating region.

26. A hollow-fibre permeability apparatus according to claim 21, in which said inlet tube for recycling said first fluid is fifurcated, two ends of said bifurcated inlet tube are connected to respective ends of one side of said housing and said outlet tube for recycling said first fluid is connected to the central portion of the other side of said housing.

27. A hollow-fibre permeability apparatus according to claim 21, in which said inlet tube for supplying said first fluid is branched from said inlet tube for recycling said first fluid, and said outlet tube for discharging said first fluid is branched from said outlet tube for recycling said first fluid.

28. A hollow-fibre permeability apparatus according to claim 1, in which said inlet and outlet tubes are connected to means for supplying said first fluid to and withdrawing said first fluid from said housing in a single pass without recycling said first fluid.

29. A hollow-fibre permeability apparatus according to claim 28, in which said outlet tube for withdrawing said first fluid is bifurcated two ends of said bifurcated outlet tube are connected to respective ends of one side of said housing, and said inlet tube for supplying said first fluid is connected to the central portion of the other side of said housing.

30. A hollow-fibre permeability apparatus according to claim 28, in which said inlet tube for supplying said first fluid is bifurcated two ends of said bifurcated inlet tube are connected to respective ends of one side of said housing, and said outlet tube for withdrawing said first fluid is connected to the central portion of the other side of said housing.

31. A hollow fiber permeability apparatus according to claim 1, in which said inlet tube and outlet tube are used for recycling said fluid, wherein said fluid led out of said outlet tube is regenerated by adsorbent and then recycled to said inlet tube.

32. A hollow-fibre permeability apparatus according to claim 1, in which at least one of said inlet and outlet tubes are connected to said enlarged cross-section portion, and means is provided for widely distributing said first fluid from said inlet tube into said enlarged cross-section portion over substantially all of one cross-sectional dimension of said permeating region, and/or for widely collecting said first fluid into said enlarged cross-section from substantially all of one cross-sectional dimension of said permeating region, for withdrawal from said enlarged cross-section portion through said outlet tube.

33. A hollow-fibre permeability apparatus according to claim 32, in which the length of said permeating region in the lengthwise direction of said hollow fibres is smaller than longer side of the perpendicular cross-section to the hollow-fibres of said permeating region and said enlarged cross-section portion is formed along said longer side of the cross-section.

* * * * *